United States Patent
Oh

(10) Patent No.: US 8,478,257 B2
(45) Date of Patent: Jul. 2, 2013

(54) MOBILE TERMINAL AND CONTROL METHOD THEREOF

(75) Inventor: Soohwan Oh, Yongin-Si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/247,923

(22) Filed: Sep. 28, 2011

(65) Prior Publication Data

US 2012/0077477 A1 Mar. 29, 2012

(30) Foreign Application Priority Data

Sep. 29, 2010 (KR) .................. 10-2010-0094784

(51) Int. Cl.
*H04M 3/42* (2006.01)

(52) U.S. Cl.
USPC ........................................ 455/414.2; 455/557

(58) Field of Classification Search
USPC ............... 455/414.1–414.4, 418–420, 550.1, 455/552.1, 556.1–557, 569.1–569.2
See application file for complete search history.

(56) References Cited

U.S. PATENT DOCUMENTS

| | | | |
|---|---|---|---|
| 7,292,588 B2 * | 11/2007 | Milley et al. ................ | 370/401 |
| 7,450,961 B1 * | 11/2008 | Heubel et al. ............. | 455/556.1 |
| 2002/0032048 A1 * | 3/2002 | Kitao et al. .................. | 455/569 |
| 2003/0153355 A1 * | 8/2003 | Warren ........................ | 455/557 |
| 2009/0117890 A1 * | 5/2009 | Jacobsen et al. ............. | 455/419 |
| 2009/0176481 A1 * | 7/2009 | Hamilton et al. .......... | 455/414.2 |
| 2009/0257432 A1 | 10/2009 | Yamaguchi et al. | |
| 2010/0203824 A1 * | 8/2010 | Chang et al. ................ | 455/3.06 |

FOREIGN PATENT DOCUMENTS

| KR | 10-2006-0013579 A | 2/2006 |
|---|---|---|
| KR | 10-2008-0083860 A | 9/2008 |

* cited by examiner

*Primary Examiner* — Kashif Siddiqui
(74) *Attorney, Agent, or Firm* — Birch, Stewart, Kolasch & Birch, LLP

(57) ABSTRACT

A mobile terminal and a control method thereof are provided. Contents displayed in a mobile terminal may be optimized for and displayed on a different mobile terminal in communication therewith. The method for controlling a mobile terminal includes: outputting previously stored contents to a first mobile terminal; and controlling a transmission of the contents being outputted based on characteristic information of a second mobile terminal that is to receive at least a portion of the contents being outputted, wherein there is a difference between the contents being outputted to the first mobile terminal and the contents the second mobile terminal is to receive and output.

25 Claims, 14 Drawing Sheets

# MOBILE TERMINAL AND CONTROL METHOD THEREOF

CROSS REFERENCE TO RELATED APPLICATIONS

The present application is related to, and claims priority to, Korean patent application KR 10-2010-0094784, filed on Sep. 29, 2010, the entire contents of which are incorporated herein by reference.

BACKGROUND OF THE INVENTION

1. Field of the Invention

Embodiments of the present invention relate to a mobile terminal and a control method thereof 2. Description of the Related Art In general, mobile terminals perform a global positioning system (GPS) function, a call function, a contents transmission and reception function, and provide the performing results to users.

SUMMARY OF THE INVENTION

An object of the present disclosure is to provide a mobile terminal that can display the contents being displayed on a different mobile terminal in communication therewith, and a control method thereof.

Another object of the present disclosure is to provide a mobile terminal that controls an output of certain contents transmitted from a different mobile terminal according to an operational state of a vehicle, and a control method thereof.

Another object of the present disclosure is to provide a mobile terminal that provides information regarding one or more controllable application programs among a plurality of application programs that can be controlled by a different mobile terminal, and a control method thereof.

Another object of the present disclosure is to provide a mobile terminal that newly configures contents, being displayed on a different mobile terminal, according to a configuration state of the mobile terminal, and provides the newly configured contents, and a control method thereof.

Another object of the present disclosure is to provide a mobile terminal that newly configures contents, being displayed on a different mobile terminal, according to display characteristics of the mobile terminal, and provides the newly configured contents, and a control method thereof.

Another object of the present disclosure is to provide a mobile terminal that prevents contents, which is being displayed on the mobile terminal, from being provided to a different terminal when the contents is pre-set contents (pre-set security-set contents), and a control method thereof.

Another object of the present disclosure is to provide a mobile terminal that continuously provides contents, which has been previously displayed on the mobile terminal, to a different terminal and outputs contents corresponding to a pre-set event, when the pre-set event occurs, and a control method thereof.

In order to achieve the above objects, there is provided a method for controlling a mobile terminal, including: outputting previously stored contents to a first mobile terminal; and controlling a transmission of the contents being outputted based on characteristic information of a second mobile terminal that is to receive at least a portion of the contents being outputted, wherein there is a difference between the contents being outputted to the first mobile terminal and the contents the second mobile terminal is to receive and output.

The contents may include at least one of a menu screen image, an image data, a voice data, contents information according to certain function execution results or certain application program execution results.

The contents information may include at least one of the title of the contents, brief information regarding the contents, and storage date of the contents.

The characteristic information of the second mobile terminal may include at least one of speed information of the second mobile terminal, particular list information regarding one or more application programs which can be controlled by the second mobile terminal, and configuration information of the second mobile terminal.

The controlling of the transmission of the contents being outputted may include: transmitting only contents information included in the contents to the second mobile terminal when the speed information of the second mobile terminal is greater than a pre-set threshold value; and transmitting the contents to the second mobile terminal when the speed information of the second mobile terminal is smaller than or equal to the threshold value.

The controlling of the transmission of the contents being outputted may include: searching for an application program name commonly included in list information including at least one of an application program name, an application program type, and an application program icon/emoticon of at least one application program previously stored in the first mobile terminal, and the particular list information; generating a menu list based on one or more application program names commonly included in the list information and the particular list information; and transmitting the generated menu list to the second mobile terminal.

The menu list may include at least one of an application program name, an application program type, and an application program icon/emoticon of one or more applications which can be controlled by the second mobile terminal among at least one application program previously stored in the first mobile terminal.

The controlling of the transmission of the contents being outputted may include: generating new contents based on the contents being outputted and video codec configuration information or audio codec configuration information of the second mobile terminal; and transmitting the generated new contents to the second mobile terminal.

The generating of the new contents may include: magnifying or reducing a menu space with respect to menus included in the contents being outputted based on the video codec configuration information of the second mobile terminal; magnifying or reducing with respect to text included in the contents being outputted based on the video codec configuration information of the second mobile terminal; and adding a particular user interface or a particular graphic user interface to the contents being outputted.

The controlling of the transmission of the contents being outputted may include: generating new contents based on the contents being outputted and horizontal display characteristic information included in the display characteristic information of the second mobile terminal or generating new contents based on the contents being outputted and vertical display characteristic information included in the display characteristic information of the second mobile terminal; and transmitting the generated new contents to the second mobile terminal.

The controlling of the transmission of the contents being outputted may include: checking whether the contents being outputted is included in particular contents for which a security function has been set; and when the contents being outputted is included in the particular contents, transmitting pre-set second contents corresponding to the particular contents to the second mobile terminal.

In the controlling of the transmission of the contents being output, when a pre-set event occurs, the contents being outputted may be transmitted in a background state to the second mobile terminal, and pre-set second contents corresponding to the event may be simultaneously outputted.

In the controlling of the transmission of the contents being output, when the function of the second contents is terminated, the contents being outputted may be transmitted to the second mobile terminal immediately when the contents is outputted.

To achieve the above objects, there is also provided a mobile terminal including: a display unit configured to output contents previously stored in a storage unit; and a controller configured to control a transmission of the contents being outputted based on characteristic information of a second mobile terminal which is to receive at least a portion of the contents being output, wherein there is a difference between the contents being outputted to the display unit and the contents the second mobile terminal is to receive and output.

To achieve the above objects, there is also provided a method for controlling a mobile terminal, including: receiving contents transmitted from a first mobile terminal via a communication unit; and controlling an output of the received contents based on characteristic information of the mobile terminal that outputs the received contents, wherein there is a difference between the received contents and the contents being outputted.

To achieve the above objects, there is also provided a mobile terminal including: a communication unit configured to receive contents transmitted from a first mobile terminal; a display unit; and a controller configured to control an output of the received contents based on characteristic information of the mobile terminal that outputs the received contents, wherein there is a difference between the received contents and the contents outputted to the display unit.

The foregoing and other objects, features, aspects and advantages of the present invention will become more apparent from the following detailed description of the present invention when taken in conjunction with the accompanying drawings.

DETAILED DESCRIPTION OF THE INVENTION

Figure 1:
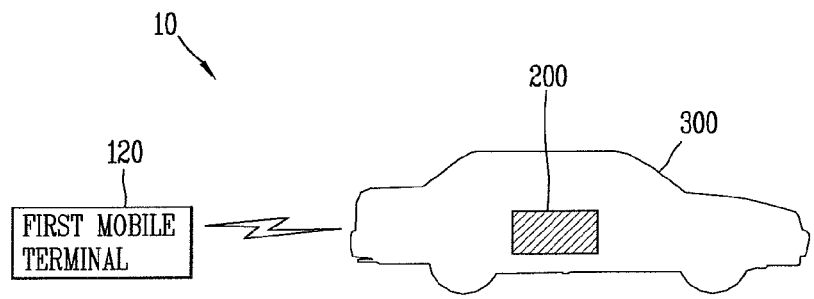
FIG. 1 is a view showing the configuration of a mobile terminal system according to an embodiment of the present invention.

Exemplary embodiments of the present invention will now be described with reference to the accompanying drawings. The same reference numeral will be used for the same or equivalent components and a repeated description thereof will be omitted.

FIG. 1 is a view showing the configuration of a mobile terminal system according to an embodiment of the present invention. As shown in FIG. 1, a mobile terminal system 10 includes a first mobile terminal 100, and a second mobile terminal 200 provided in a vehicle 300 or adjacent to the vehicle 300.

The first mobile terminal 100 may be any one of a smartphone, a portable terminal, a mobile terminal, a telematics terminal, a notebook computer, a digital broadcast terminal, a PDA (Personal Digital Assistant), a Wibro terminal, an IPTV (Internet Protocol Television) terminal, an AVN (Audio Video Navigation) terminal, a PMP (Portable Multimedia Player), a navigation terminal (vehicle navigation device), and the like.

The first mobile terminal 100 may output certain stored contents and transmit the contents being outputted to a second mobile terminal 200 in communication with the first mobile terminal.

The first mobile terminal 100 may output certain stored contents, and transmit the contents being outputted or contents information included in the contents to the second mobile terminal based on speed information (including speed information of the second mobile terminal 200, speed information of a vehicle including the second mobile terminal 200, or the like) transferred from the second mobile terminal 200 in communication therewith.

Also, the first mobile terminal 100 may generate list information including information regarding an application program name (or a package name), an application program type, an application program icon/emoticon, or the like, of one or more application programs previously stored in the first mobile terminal 100, and transmit the generated list information to the second mobile terminal 200.

Also, the first mobile terminal 100 may generate a new menu list including an application program which has been previously set and can be controlled by the second mobile terminal 100 in the generated list information, and transmit the generated menu list to the second mobile terminal 200.

Also, in a state in which the previously stored certain contents are being outputted, the first mobile terminal 100 may newly set (or generate) the contents being outputted based on configuration information (or video codec configuration information) of the second mobile terminal 200 in communication therewith and transmit the newly configured information (or newly generated contents) to the second mobile terminal 200.

Also, in a state in which the previously stored certain contents are being outputted, the first mobile terminal 100 may newly set (or generate) the contents being outputted based on display characteristics of the second mobile terminal 200 in communication therewith and transmit the newly configured information (or newly generated contents) to the second mobile terminal 200.

Also, in a state in which the previously stored certain contents are being outputted, when the contents being outputted is contents for which a protection function has been set, the first mobile terminal 100 may transmit previously stored particular contents corresponding to the contents being outputted, to the second mobile terminal 200, rather than transmitting the contents being outputted to the second mobile terminal 200.

Also, in a state in which the previously stored certain contents are being outputted, when a pre-set particular event occurs, the first mobile terminal 100 may transmit the certain contents being outputted, in a background state, to the second mobile terminal 200 in communication therewith and, at the same time, output particular contents corresponding to the pre-set particular event to the first mobile terminal 100.

Also, the first mobile terminal 100 may be connected to one or more of various systems such as a certain server (not shown), a call center (not shown), an information providing center (not shown), a base station (not shown), a network service system, or the like, in order to communicate therewith, and transmit and receive various types of information including various control signals, and the like, to and from the connected system.

In this case, the network service system may include a social network service system, or the like. Also, the social network service system may include twitter (micro-blog type), me2DAY (micro-blog type) of NAVER, today (micro-blog type) of DAUM, connect (micro-blog type) of NATE, cyworld, Linknow, face book (North America), My space (North America), Linked-in (North America), Nexopia (Canada), Bibo (Europe), Hi5 (Europe), My space (Europe), do12day (Europe), Tagged (Europe), XING, Skyrock (Europe), Orkut (South America and Central America), Hi5 (South America and Central America), Friendster (Asia and the Pacific Coast), Multiply (Asia and the Pacific Coast), Orkut (Asia and the Pacific Coast), Xiaonei (Asia and the Pacific Coast), and the like.

The second mobile terminal 200 may be any one of various terminals such as a car audio device provided in the vehicle 300, a smartphone, a portable terminal, a mobile terminal, a telematics terminal, a PDA, a Wibro terminal, a navigation terminal, an AVN terminal, and the like.

Also, the second mobile terminal 200 may receive certain contents transmitted from the first mobile terminal 100 and output the received contents.

Also, in response to a request from the first mobile terminal 100, the second mobile terminal 200 may transmit speed information of the vehicle 300 including the second mobile terminal 200 or adjacent to the second mobile terminal 200, to the first mobile terminal 100.

Also, the second mobile terminal 200 may receive information transmitted from the first mobile terminal 100 in response to the transmitted speed information, and output contents or contents information included in the received information.

Also, the second mobile terminal 200 may receive list information including information regarding an application program name (or a package name), an application program type, an application program icon/emoticon, or the like, of an application program transmitted from the first mobile terminal 100, and output the received list information.

Also, the second mobile terminal 200 may check (or search for) a pre-set application program which can be controlled by the second mobile terminal in the received list information, generate a new menu list based on the checked application program, and output the generated menu list.

Also, the second mobile terminal 200 may receive a menu list including an application program which can be controlled by the second mobile terminal transmitted from the first mobile terminal and output the received menu list.

Also, the second mobile terminal 200 may receive set contents according to a configuration state of the second mobile terminal 200 with respect to the contents being outputted from the first mobile terminal 100, and output the received contents.

Also, the second mobile terminal 200 may receive set contents according to display characteristics of the second mobile terminal 200 with respect to the contents being outputted from the first mobile terminal 100, and output the received contents.

Figure 2:
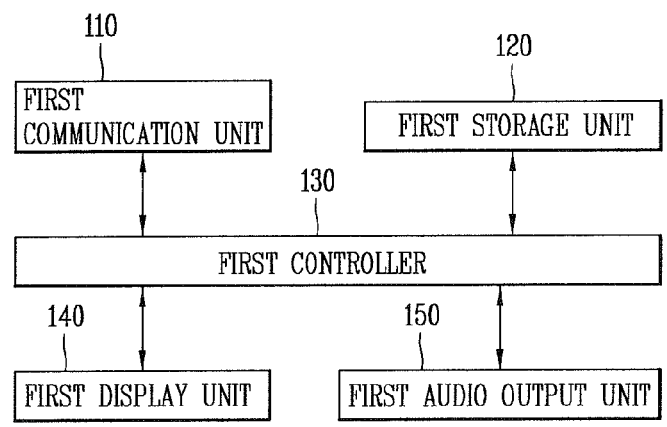
FIG. 2 is a schematic block diagram showing the configuration of a first mobile terminal according to an embodiment of the present invention.

FIG. 2 is a schematic block diagram showing the configuration of the first mobile terminal 100 according to an embodiment of the present invention.

The first mobile terminal 100 may be implemented in various forms. For example, the first mobile terminal 100 may be any one of a smartphone, a portable terminal, a mobile terminal, a telematics terminal, a notebook computer, a digital broadcast terminal, a PDA (Personal Digital Assistant), a Wibro terminal, an IPTV (Internet Protocol Television) terminal, an AVN (Audio Video Navigation) terminal, a PMP (Portable Multimedia Player), a navigation terminal (vehicle navigation device), and the like.

As shown in FIG. 2, the first mobile terminal 100 includes a first communication unit 110, a first storage unit 120, a first controller 130, a first display unit 140, and a first audio output unit 150. The first mobile terminal 100 illustrated in FIG. 2 are not all essential components; the first mobile terminal 100 may be implemented with a larger number of components or with a smaller number of components than those illustrated in FIG. 2.

The first communication unit 110 connects the first mobile terminal 100 with an external terminal (e.g., the second mobile terminal 200) and/or a certain system through a wired/wireless communication network to allow for communication. Here, as the wireless internet technique, a wireless local area network (WLAN), Wi-Fi, wireless broadband (Wibro), world interoperability for microwave access (WiMAX), high speed downlink packet access (HSDPA), IEEE 802.16, long-term evolution (LTE), a wireless mobile broadband service (WMBS), and the like, may be used. Also, a short-range communication technique may include Bluetooth™, Radio Frequency IDentification (RFID), Infrared Data Association (IrDA), Ultra-WideBand (UWB), ZigBee™, and the like. Also, a wired communication technique may include universal serial bus (USB) communication, or the like. Here, the certain system may include various systems such as a server, a call center, an information providing center, a base station, a network service system (NSS), or the like.

Also, the first communication unit 110 may receive various types of information including a control signal, speed information, and the like, transmitted from a certain terminal and/or system connected for wired/wireless communication.

Also, the first communication unit 110 may transmit various types of information including a certain control signal, contents, contents information, list information, a menu list, and the like, to the certain terminal under the control of the first controller 130.

Also, the first communication unit 110 may perform a call function with a certain wired/wireless terminal. In this case, the call function may include a data communication function, a voice communication function, a video/video conference/call function, a message function, and the like.

The first storage unit 120 may store various user interfaces (UIs) and/or graphic user interfaces (GUIs).

Also, the first storage unit 120 may store data, programs, and the like, required for operating the first mobile terminal 100.

Also, the first storage unit 120 may include at least one storage medium among a flash memory type, a hard disk type, a multimedia card micro type, a card-type memory (e.g., SD or DX memory, etc), a magnetic memory, a magnetic disk, an optical disk, a Random Access Memory (RAM), a Static Random Access Memory (SRAM), a Read-Only Memory (ROM), an Electrically Erasable Programmable Read-Only Memory (EEPROM), and a Programmable Read-Only memory (PROM).

Also, the first storage unit 120 stores map data. Here, the stored map data may include geographic coordinates (or longitude/latitude coordinates) representing the latitude and longitude by DMS (Degree/Minute/Second) unit. Here, besides the geographic coordinates, as the stored map data, universal transverse mercator (UTM) coordinates, universal polar system (UPS) coordinates, transverse mercator (TM) coordinates, and the like, may be also used.

Also, the stored map data may include version information, and when it is updated to a new version of map data, the newly updated map data may include various types of information (including detailed information, supplementary information, additional information, and the like) regarding a newly added new road.

Also, the storage unit 120 may store various types of information such as various menu screen images, a point of interest (POI), function characteristic information according to a particular location of the map data, and the like.

Also, the storage unit 120 may store various types of status information (or route search supplementary information) such as a road status (or traffic information) using TPEG information, or the like, vehicle traffic information, lane information of each road, and the like.

Also, the storage unit 120 may store speed information received through the first communication unit 110, a type (an application program name) of an application program which can be controlled by a certain terminal, video codec configuration information of the certain terminal, display characteristics of the certain terminal, and the like.

The first controller 130 controls a general operation of the first mobile terminal 100.

Also, the first controller 130 outputs certain contents selected from among a plurality of contents previously stored in the first storage unit 120 through the first display unit 140 and/or the first audio output unit 150. In this case, the contents may be the results (or data according to the function execution results) obtained by executing a certain function (or a certain application program) previously stored in the first storage unit 120. Also, the data (or information) according to the function execution results may include a screen image (including various menu screen images) such as a user interface and/or graphic user interface, or the like, previously stored in the first storage unit 120, image data (including a still image, a video, and the like), voice data, information regarding the contents (or contents information), and the like. Here, the contents information (including information related to the function or an application program, or the like) may include the title of the contents, brief information regarding the contents, a storage (creation) date of the contents, and the like. Also, when a pre-set event occurs such as when a pre-set button or a pre-set key is selected, when a pre-set time arrives, or the like, the first controller 130 may output the contents via the first display unit 140 and/or the first audio output unit 150.

Also, in a state in which the contents is being outputted through the first display unit 140 and/or the first audio output unit 150, the first controller 130 may transmit the contents being outputted to a certain terminal (e.g., the second mobile terminal 200) in communication through the first communication unit 110.

Also, in a state in which the contents is being outputted through the first display unit 140 and/or the first audio output unit 150, the first controller 130 may transmit the contents being outputted based on speed information (or speed information of the vehicle including the second mobile terminal 200) of the second mobile terminal 200 received through the first communication unit 110 to the second mobile terminal 200 through the first communication unit 110 or transmit contents information included in the contents being outputted to the second mobile terminal 200 through the first communication unit 110.

Also, when a pre-set menu screen button is selected, the first controller 130 may generate list information regarding one or more application programs based on a plurality of application programs previously stored in the first storage unit 120, and transmit the generated list information to the second mobile terminal 200 through the first communication unit 110. In this case, the list information may include information regarding an application program name (or a package name), an application program type, an application program icon/emoticon, or the like.

Also, when a pre-set menu screen button is selected, the first controller 130 may generate list information regarding one or more application programs based on a plurality of application programs previously stored in the first storage unit 120, and check whether the generated list information includes an application program included in first list information previously stored in the first storage unit 120. Upon checking, when one or more application programs included in the previously stored first list information are included in the generated list information, the first controller 130 may generate a menu list based on the one or more application programs as checked. In this case, the first list information may include information regarding one or more particular application programs (including particular application program names, particular application program types, particular application program icon/emoticons, or the like), which can be controlled by a certain mobile terminal (e.g., the second mobile terminal 200). Also, the generated menu list may include information regarding an application program name, an application program type, an application program icon/emoticon, and the like. Also, the first controller 130 may transmit the generated menu list to the second mobile terminal 200 through the first communication unit 110.

Also, in a state in which the contents is being outputted through the first display unit 140 and/or the first audio output unit 150, the first controller 130 may generate (or set) the contents being outputted according to a configuration state of the second mobile terminal based on video codec configuration information (including codec configuration information related to screen setting, audio codec configuration information, and the like) of the second mobile terminal 200 previously stored in the first storage unit 120, and transmit the generated information to the second mobile terminal 200 through the first communication unit 110.

Also, in a state in which the contents is being outputted through the first display unit 140 and/or the first audio output unit 150, the first controller 130 may generate (or set) the contents being outputted according to display characteristics of the second mobile terminal 200 based on the display characteristics of the second mobile terminal 200 previously stored in the first storage unit 120 and transmit the generated information to the second mobile terminal 200 through the first communication unit 110. In this case, the display characteristics may include horizontal display characteristics, vertical display characteristics, or the like, according to the ratio between the width and length of the screen set according to the characteristics of the display unit of the terminal.

Also, in a state in which the contents is being outputted through the first display unit 140 and/or the first audio output unit 150, when the contents being outputted is contents for which a security function has been set, the first controller 130 may transmit particular contents corresponding to the contents, rather than transmitting the contents being outputted, to the second mobile terminal 200 through the first communication unit 110.

Also, in a state in which first contents is being outputted through the first display unit 140 and/or the first audio output unit 150, when a pre-set particular event occurs, the first controller 130 may continuously transmit the first contents being outputted, in a background state, to the second mobile terminal 200 through the first communication unit 110 and, at the same time, output particular contents corresponding to the pre-set particular event through the first display unit 140 and/or the first audio output unit 150. In this case, the particular contents may be execution results (or data according to the results obtained by executing the particular function) of a particular function (or a particular application program) previously stored in the first storage unit 120. Also, the data (or information) according to the particular function execution results may include a screen image (including various particular menu screen images) such as a user interface and/or graphic user interface previously stored in the first storage unit 120, particular image data (including a still image, a video, and the like), particular voice data, information related to the particular contents (or particular contents information), and the like. Also, when the pre-set particular event is normally terminated, the first controller 130 may output the first contents which has been operated in the background state to the first display unit 140 and/or the first audio output unit 150 and, at the same time, transmit the first contents to the second mobile terminal 200 through the first communication unit 110.

The first display unit 140 may display various contents such as various menu screen images, road guidance information, and the like, by using a user interfaces and/or a graphic user interface stored in the first storage unit 120 under the control of the first controller 130. Here, the contents displayed on the first display unit 140 may include a menu screen image including various text or image data (including map data or various information data), and data such as icons, list menus, combo boxes, and the like.

Also, the first display unit 140 may include at least one of a liquid crystal display (LCD), a thin film transistor-LCD (TFT-LCD), an organic light emitting diode (OLED) display, a flexible display, a three-dimensional (3D) display, and a light emitting diode (LED).

Meanwhile, when the first display unit 140 and a sensor (referred to as a 'touch sensor', hereinafter) for detecting a touch operation are overlaid in a layered manner to form a touch screen, the first display unit 140 may function as both an input device and an output device. The touch sensor may have a form of a touch film, a touch sheet, a touch pad, a touch panel, and the like.

The touch sensor may be configured to convert pressure applied to a particular portion of the first display unit 140 or a change in the capacitance or the like generated at a particular portion of the first display unit 140 into an electrical input signal. The touch sensor may be configured to detect the pressure when a touch is applied, as well as the touched position and area. When there is a touch input with respect to the touch sensor, a corresponding signal (signals) is transmitted to a touch controller (not shown). The touch controller processes the signals and transmits corresponding data to the first controller 130. Accordingly, the first controller 130 may recognize which portion of the first display unit 140 has been touched.

The first display unit 140 may include a proximity sensor. The proximity sensor may be disposed in an internal area of the first mobile terminal covered by the touch screen or in the vicinity of the touch screen.

The proximity sensor refers to a sensor for detecting the presence or absence of an object relative to a certain detection surface or an object that exists nearby by using the force of electromagnetism or infrared rays without a physical contact.

Thus, the proximity sensor has a considerably longer life span compared with a contact type sensor, and it can be utilized for various purposes.

Examples of the proximity sensor may include a transmission type photoelectric sensor, a direct reflection type photoelectric sensor, a mirror-reflection type photoelectric sensor, an RF oscillation type proximity sensor, a capacitance type proximity sensor, a magnetic proximity sensor, an infrared proximity sensor, and the like. In case in which the touch screen is the capacitance type, proximity of the pointer is detected by a change in electric field according to the proximity of the pointer. In this case, the touch screen (touch sensor) may be classified as a proximity sensor.

In the following description, for the sake of brevity, recognition of the pointer positioned to be close to the touch screen will be called a 'proximity touch', while recognition of actual contacting of the pointer on the touch screen will be called a 'contact touch'. In this case, when the pointer is in the state of the proximity touch, it means that the pointer is positioned to correspond vertically to the touch screen.

The proximity sensor may detect a proximity touch and a proximity touch pattern (e.g., a proximity touch distance, a proximity touch speed, a proximity touch time, a proximity touch position, a proximity touch movement state, or the like). Information corresponding to the detected proximity touch operation and the proximity touch pattern may be outputted to the touch screen.

In this manner, when the first display unit 140 is used as an input device, it may receive a user's button manipulation or receive a command or a control signal according to a manipulation such as touch/scrolling a displayed image.

The first audio output unit 150 may output voice information under the control of the first controller 130. Here, the first audio output unit 150 may be a speaker.

The first mobile terminal 100 may further include a first input unit (not shown) for receiving a signal according to a user's button manipulation or a certain function selection or receiving a command or a control signal generated through manipulation such as touch/scrolling a displayed image.

Also, the first input unit may receive a signal corresponding to information inputted by the user. As the first input unit, various devices such as a keypad, a touch screen, a dome switch, a touch pad (e.g., a touch sensitive member that detects changes in resistance, pressure, capacitance, etc. due to being contacted) a jog shuttle, a mouse, a stylus, a touch pen, and the like, may be used.

Also, the first input unit may include a microphone (not shown) and/or a camera (not shown), and receive voice information and/or image information through the microphone and/or a camera.

Also, the first mobile terminal 100 may further include a first GPS receiver (not shown) for receiving a GPS signal transmitted from a satellite, generates first location data of the first mobile terminal 100 in real time based on longitude coordinates or latitude coordinates included in the GPS signal, and outputs the generated first location data to a map matching unit (not shown). Here, the generated first location data is defined as a current location (or current location data) of the first mobile terminal 100.

Also, the signal received through the first GPS receiving unit may provide terminal location information to the first mobile terminal 100 by using a wireless communication scheme such as 802.11, a standard of the wireless network for a WLAN including wireless LAN, some infrared communication, and the like, 802.15, a standard for a wireless personal area network (PAN) including Bluetooth™, UWB, Zig-Bee™, and the like, 802.16, a standard for a wireless metropolitan area network (MAN) including a fixed wireless access (FWA), broadband wireless access (BWA), and the like, and 802.20, a standard for the mobile Internet with respect to a mobile broadband wireless access (MBWA) including Wibro, WiMAX, and the like, proposed by IEEE (Institute of Electrical and Electronics Engineers).

Also, the first mobile terminal 100 may further include a DR sensor (not shown).

The DR sensor measures a proceeding direction and speed of the first mobile terminal, generates second location data based on the measured proceeding direction and speed of the first mobile terminal 100, and outputs the generated second location data to the map matching unit.

The DR sensor outputs the measured proceeding direction and speed information to the first storage unit 120 and to the first controller 130.

The first GPS receiving unit constitutes a data collection unit along with the DR sensor.

A technique for generating an estimated location of the first mobile terminal 100 based on the first location data generated by the first GPS receiving unit and the second location data generated by the DR sensor is a known art, so a detailed description thereof will be omitted.

The map matching unit generates an estimated location of the first mobile terminal 100 based on the first location data and the second location data and reads map data corresponding to a proceeding route from the first storage unit 120. Also, the location-based technique mainly uses the GPS information, a signal received by the first GPS receiving unit, but a hybrid positioning system using a cell tower signal triangulation and Wi-Fi positioning information in addition to the GPS information may be also used.

Also, the map matching unit matches the estimated location of the first mobile terminal 100 to a link (road) included in the map data, and outputs the matched map data (i.e., the map matching results) to the first controller 130. For example, the map matching unit generates the estimated location of the first mobile terminal 100 based on the first location data and the second location data, matches the generated estimated location of the first mobile terminal 100 to links in the map data stored in the first storage unit 120 according to link order, and outputs the matched map information (i.e., the map matching results) to the first controller 130. In this case, the matched map information (map matching results) is information generated with reference to traffic situation (or a traffic flow state) of each road using pre-set user information, transport protocol expert group (TPEG) information, or the like. Here, the TPEG information is transmitted from an external information providing center or a call center connected through the first communication unit 110.

The map matching unit may output information regarding road attributes such as one-storied road, duplex-storied road, and the like, included in the matched map information (map matching results) to the first controller 130.

The function of the map matching unit may be implemented in the first controller 130.

Figure 3:
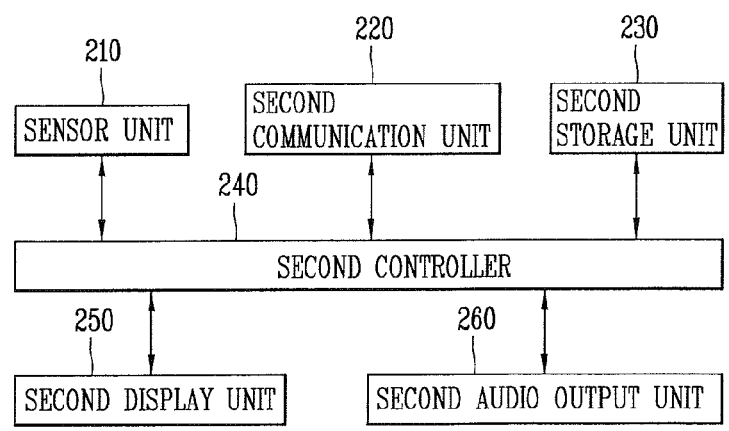
FIG. 3 is a schematic block diagram showing the configuration of a second mobile terminal according to an embodiment of the present invention.

FIG. 3 is a schematic block diagram showing the configuration of a second mobile terminal according to an embodiment of the present invention.

The second mobile terminal 200 may be implemented in various forms. For example, the second mobile terminal 200 may be any one of various terminals such as a car audio device provided in the vehicle 300, a smartphone, a portable terminal, a mobile terminal, a telematics terminal, a PDA, a Wibro terminal, a navigation terminal, an AVN terminal, and the like.

As shown in FIG. 3, the second mobile terminal 200 includes a sensor unit 210, a second communication unit 220, a second storage unit 230, a second controller 240, a second display unit 250, and a second audio output unit 260. The second mobile terminal 200 illustrated in FIG. 3 are not all essential components; the second mobile terminal 200 may be implemented with a larger number of components or with a smaller number of components than those illustrated in FIG. 3.

The sensor unit 210 may detect speed information of the vehicle 300 including the second mobile terminal 200, speed information of the vehicle 300 adjacent to the second mobile terminal 200, and speed information of the second mobile terminal 200.

Also, the sensor unit 210 may include a motion recognition sensor for detecting a motion of an object. Here, the motion recognition sensor may include sensors such as a sensor for recognizing a motion or position of an object, a geomagnetic sensor, an acceleration sensor, a gyro sensor, an inertial sensor, an altimeter, a vibration sensor, and may additionally include sensors related to a motion recognition.

The sensor unit 210 may detect an opened or closed state of the door of the vehicle 300.

Also, the sensor unit 210 may detect a change in the voltage of a battery included in a battery management system (BMS) of the vehicle 300 including the second mobile terminal 200.

The second communication unit 220 connects the first mobile terminal 100 with an external terminal (e.g., the first mobile terminal 100) and/or a certain system through a wired/wireless communication network to allow for communication. Here, as the wireless internet technique, a wireless local area network (WLAN), Wi-Fi, wireless broadband (Wibro), world interoperability for microwave access (WiMAX), high speed downlink packet access (HSDPA), IEEE 802.16, long-term evolution (LTE), a wireless mobile broadband service (WMBS), and the like, may be used. Also, a short-range communication technique may include Bluetooth™, Radio Frequency IDentification (RFID), Infrared Data Association (IrDA), Ultra-WideBand (UWB), ZigBee™, and the like. Also, a wired communication technique may include universal serial bus (USB) communication, or the like. Here, the certain system may include various systems such as a server, a call center, an information providing center, a base station, a network service system (NSS), or the like.

Also, the second communication unit 220 may receive various types of information including a control signal, contents, contents information, list information, a menu list, or the like, transmitted from a certain mobile terminal and/or system connected for wired/wireless communication.

Also, the second communication unit 220 may perform communication connection between the second mobile terminal 200 and the vehicle 300 by using a controller area network (CAN), a vehicle network system within the vehicle 300, or a short-range communication network.

Also, the second communication unit 220 receives vehicle status information transmitted from the vehicle 300. In this case, the vehicle status information may include speed information, engine on/off information of the vehicle, door on/off information, battery status information, vehicle location information, oil status information, tire pneumatic pressure information, and the like.

Also, the second communication unit 200 may transmit various types of information including a certain control signal, the speed information, or the like, to the certain mobile terminal under the control of the second controller 240.

Also, the second communication unit 220 may perform a call function with a certain wired/wireless terminal In this case, the call function may include a data communication function, a voice communication function, a video/video conference/call function, a message function, and the like.

The second storage unit 230 may store various user interfaces (UIs) and/or graphic user interfaces (GUIs).

Also, the second storage unit 230 may store data, programs, and the like, required for operating the second mobile terminal 200.

Also, second storage unit 230 may include at least one storage medium among a flash memory type, a hard disk type, a multimedia card micro type, a card-type memory (e.g., SD or DX memory, etc), a magnetic memory, a magnetic disk, an optical disk, a Random Access Memory (RAM), a Static Random Access Memory (SRAM), a Read-Only Memory (ROM), an Electrically Erasable Programmable Read-Only Memory (EEPROM), and a Programmable Read-Only memory (PROM).

Also, the second storage unit 230 stores map data. Here, the stored map data may include geographic coordinates (or longitude/latitude coordinates) representing the latitude and longitude by DMS (Degree/Minute/Second) unit. Here, besides the geographic coordinates, as the stored map data, universal transverse mercator (UTM) coordinates, universal polar system (UPS) coordinates, transverse mercator (TM) coordinates, and the like, may be also used.

The second storage unit 230 may store contents, contents information, list information, a menu list, video codec configuration information, display characteristic information, or the like, received through the second communication unit 220.

The second controller 240 controls a general operation of the second mobile terminal 200.

Also, the second controller 240 outputs the contents, which has been received through the second communication unit 220, through the second display unit 250 and/or the second audio output unit 260. In this case, the contents may be the results (or data according to the function execution results) obtained by executing a certain function (or a certain application program) previously stored in the first mobile terminal 100. Also, the data (or information) according to the function execution results may include a screen image (including various menu screen images) such as a user interface and/or graphic user interface, or the like, previously stored in the first mobile terminal 100, image data (including a still image, a video, and the like), voice data, information regarding the contents (or contents information), and the like. Here, the contents information may include the title of the contents, brief information regarding the contents, a storage (creation) date of the contents, and the like.

With respect to the contents information received through the second communication unit 220, the second controller 240 outputs information included in the received contents through the second display unit 250 and/or the second audio output unit 260 based on the speed information sensed by the sensor unit 210 or the speed information received through the second communication unit 220.

Namely, when the speed information is greater than a pre-set threshold value, the second controller 240 displays a screen image according to the contents information included in the received contents and/or the user interface and/or graphic user interface stored in the second storage unit 230 on the second display unit 250. Also, when the speed information is smaller than or equal to the pre-set threshold value, the second controller 240 may output the information such as image data, voice data, or the like, included in the received contents through the second display unit 250 and/or the second audio output unit 260.

Also, the second controller 240 transmits the speed information sensed by the sensor unit 210 or the speed information received through the second communication unit 220 to the first mobile terminal 100 in communication through the second communication unit 220, receives information transmitted from the first mobile terminal 100 in response to the transmitted speed information through the second communication unit 220, and output the received information through the second display unit 250 and/or the second audio output unit 260. In this case, the received information may include contents, information regarding the contents (or contents information), a user interface/graphic user interface, a control signal, or the like.

Also, the second controller 240 may compare the list information received through the second communication unit 220 with first list information previously stored in the second storage unit 230, search for (or check) an application program which can be controlled by the second mobile terminal among application programs included in the list information based on the comparison results, and generates a new menu list by using one or more searched application programs. In this case, the generated menu list may include information regarding an application program name, an application program type, an application program icon/emoticon, or the like, of one or more searched application programs. Also, the second controller 240 may display the generated menu list on the second display unit 250.

Also, the second controller 240 may display the menu list received through the second communication unit 220 on the second display unit 250. In this case, the received menu list may be information generated based on the application program (or the application program name) which can be controlled by the second mobile terminal 200 among the plurality of application programs included in the first mobile terminal 100 which has transmitted the menu list.

Also, the second controller 240 may output the information, which has been received through the second communication unit 220, through the second display unit 250 and/or the second audio output unit 260. In this case, the received information may be information obtained by re-setting the information displayed on the first mobile terminal 100 which has transmitted the information based on the video codec configuration information of the second mobile terminal 200, or may be newly generated information.

Also, the second controller 240 may output the information, which has been received through the second communication unit 220, through the second display unit 250 and/or the second audio output unit 260. In this case, the received information may be information obtained by re-setting the information displayed on the first mobile terminal 100 which has transmitted the information based on the display characteristics of the second mobile terminal 200, or may be newly generated information.

Also, the second controller 240 may output the information, which has been received through the second communication unit 220, through the second display unit 250 and/or the second audio output unit 260. In this case, the received information may be particular contents previously set according to information being outputted from the first mobile terminal 100 when the information being outputted to the first mobile terminal 100 that has transmitted the information is security function-set contents.

Also, the second controller 240 may output first contents, which has been received through the second communication unit 220, through the second display unit 250 and/or the second audio output unit 260. In this case, the received first contents may be contents which has been transmitted to the second mobile terminal 200 by the first mobile terminal 100 by performing a transmission function with respect to the first contents in a background state even when the first mobile terminal 100, which has transmitted the first contents, is changed to a state of outputting second contents due to a pre-set event while outputting the first contents.

The second display unit 250 may display various contents such as various menu screen images, road guidance information, and the like, by using a user interfaces and/or a graphic user interface stored in the second storage unit 230 under the control of the second controller 240. Here, the contents displayed on the second display unit 250 may include a menu screen image including various text or image data (including map data or various information data), and data such as icons, list menus, combo boxes, and the like.

Also, the second display unit 250 may include at least one of a liquid crystal display (LCD), a thin film transistor-LCD (TFT-LCD), an organic light emitting diode (OLED) display, a flexible display, a three-dimensional (3D) display, and a light emitting diode (LED), each having a certain size.

Also, when second display unit 250 is used as a touch screen, it may also be used as an input device as well as as an output device. The touch sensor may have a form of a touch film, a touch sheet, a touch pad, a touch panel, and the like.

When the second display unit 250 is used as an input device, it may receive a user's button manipulation or receive a command or a control signal according to a manipulation such as touch/scrolling a displayed image.

The second audio output unit 260 may output voice information under the control of the second controller 240. Here, the second audio output unit 260 may be a speaker.

The second mobile terminal 200 may further include a second input unit (not shown) for receiving a signal according to a user's button manipulation or a certain function selection or receiving a command or a control signal generated through manipulation such as touch/scrolling a displayed image.

Also, the second input unit may receive a signal corresponding to information inputted by the user. As the first input unit, various devices such as a keypad, a touch screen, a dome switch, a touch pad (e.g., a touch sensitive member that detects changes in resistance, pressure, capacitance, etc. due to being contacted) a jog shuttle, a mouse, a stylus, a touch pen, and the like, may be used.

Also, the second input unit may include a microphone (not shown) and/or a camera (not shown), and receive voice information and/or image information through the microphone and/or a camera.

When the second mobile terminal 200 is a car audio device, the second input unit may further include a rotary knob (not shown) and an encoder (not shown).

The encoder may output an encoded value (or a pair of pulse streams) having a 90-degree phase difference according to manipulation of the rotary knob.

Also, the encoder may detect a proceeding direction of the rotary knob, e.g., a rotation in a clockwise direction or a rotation in a counterclockwise direction, and output the same.

Also, a change in the state of a pulse stream according to the manipulation of the rotary knob corresponds to a manipulation of increasing or decreasing a sound volume or increasing or decreasing a channel (or frequency). The definition of increasing or decreasing the sound volume or increasing or decreasing the channel according to the change in the state of the pulse stream may be variably set according to the design of a designer.

Also, the second mobile terminal 200 may further include a second GPS receiving unit (not shown), a second DR sensor (not shown), and a second map matching unit (not shown)

performing the same function as the first GPS receiving unit, the DR sensor, and the map matching unit included in the first mobile terminal 100, respectively.

A method for controlling a mobile terminal according to an embodiment of the present invention will now be described in detail with reference to FIGS. 1 to 20.

Figure 4:
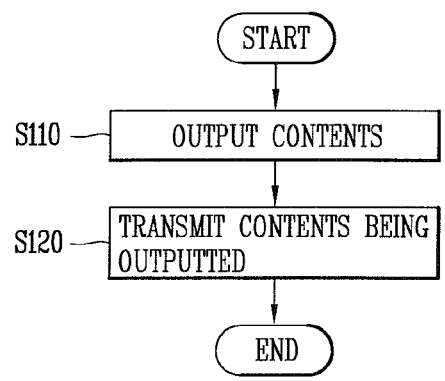
FIG. 4 is a flow chart illustrating the process of a method for controlling a mobile terminal according to a first embodiment of the present invention.

FIG. 4 is a flow chart illustrating the process of a method for controlling a mobile terminal according to a first embodiment of the present invention.

First, the first controller provides control to output certain contents previously stored in the first storage unit 120 through the first display unit 140 and/or the first audio output unit 150 (step S110). In this case, the contents may be the results (or data according to the function execution results) obtained by executing a certain function (or a certain application program) previously stored in the first storage unit 120. Also, the data (or information) according to the function execution results may include a screen image (including various menu screen images) such as a user interface and/or graphic user interface, or the like, previously stored in the first storage unit 120, image data (including a still image, a video, and the like), voice data, information regarding the contents (or contents information), and the like.

Also, when a pre-set event occurs such as when a pre-set button or a pre-set key is selected, when a pre-set time arrives, or the like, the first controller 130 may provide control to output the contents via the first display unit 140 and/or the first audio output unit 150 (step S120).

Figure 5:
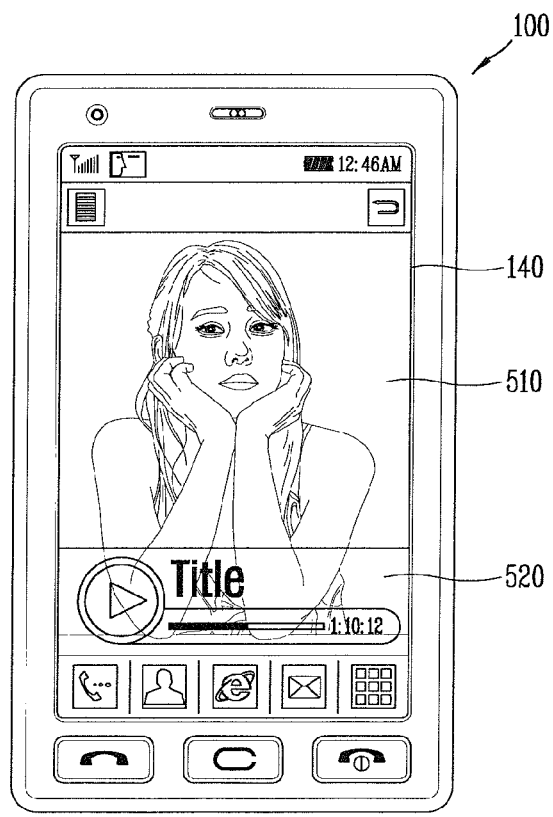
FIG. 5 is an overview of a display screen of a display unit of a mobile terminal according to an embodiment of the present invention.

For example, as shown in FIG. 5, the first controller 130 outputs a video 510 previously stored in the first storage unit 120 through the first display unit 140 and/or the first audio output unit 150. In this case, the first display unit 140 displays contents information (e.g., the title, brief information, a storage date, a reproduction time, or the like) 520 related to the displayed video 510 at a certain position (step S110).

Thereafter, the first controller 130 transmits the contents, which is being outputted through the first display unit 140 and/or the first audio output unit 150, to the second mobile terminal 200 in communication therewith through the first communication unit 110. In this case, the first communication unit 110 may include a wired/wireless communication module. Here, as the wireless internet technique, a wireless local area network (WLAN), Wi-Fi, wireless broadband (Wibro), world interoperability for microwave access (WiMAX), high speed downlink packet access (HSDPA), IEEE 802.16, long-term evolution (LTE), a wireless mobile broadband service (WMBS), and the like, may be used. Also, a short-range communication technique may include Bluetooth™, Radio Frequency IDentification (RFID), Infrared Data Association (IrDA), Ultra-WideBand (UWB), ZigBee™, and the like. Also, a wired communication technique may include universal serial bus (USB) communication, or the like. The second mobile terminal 200 may be any one of various terminals such as a car audio device provided in the vehicle, a smartphone, a portable terminal, a mobile terminal, a telematics terminal, a PDA, a Wibro terminal, a navigation terminal, an AVN terminal, and the like (step S120).

Figure 6:
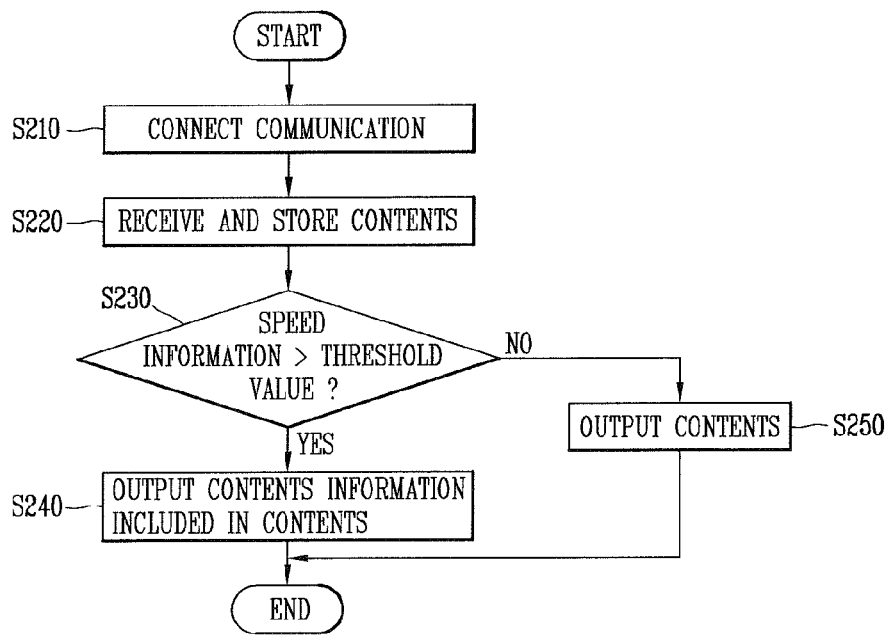
FIG. 6 is a flow chart illustrating the process of a method for controlling a mobile terminal according to a second embodiment of the present invention.

FIG. 6 is a flow chart illustrating the process of a method for controlling a mobile terminal according to a second embodiment of the present invention.

First, the second communication unit 220 performs communication connection with the first mobile terminal 100 under the control of the second controller 240 (step S210). In this case, the second communication unit 220 may include a wired/wireless communication module. Here, as the wireless internet technique, a wireless local area network (WLAN), Wi-Fi, wireless broadband (Wibro), world interoperability for microwave access (WiMAX), high speed downlink packet access (HSDPA), IEEE 802.16, long-term evolution (LTE), a wireless mobile broadband service (WMBS), and the like, may be used. Also, the short-range communication technique may include Bluetooth™, Radio Frequency IDentification (RFID), Infrared Data Association (IrDA), Ultra-WideBand (UWB), ZigBee™, and the like. Also, the wired communication technique may include universal serial bus (USB) communication, or the like. The first mobile terminal 100 may be any one of a smartphone, a portable terminal, a mobile terminal, a telematics terminal, a notebook computer, a digital broadcast terminal, a PDA (Personal Digital Assistant), a Wibro terminal, an IPTV (Internet Protocol Television) terminal, an AVN (Audio Video Navigation) terminal, a PMP (Portable Multimedia Player), a navigation terminal (vehicle navigation device), and the like.

Also, in step S210, the second communication unit 220 may perform communication connection between the second mobile terminal 200 and the vehicle 300 by using a controller area network (CAN), a vehicle network system within the vehicle 300 including the second mobile terminal 200 mounted therein, or a short-range communication network. Also, the second communication unit 220 may perform communication connection between the second mobile terminal 200 and the vehicle 300 by using a controller area network (CAN) within the vehicle 300 adjacent to the second mobile terminal 200, or a short-range communication network (step S210).

Thereafter, the second communication unit 220 receives contents transmitted from the first mobile terminal 100 (step S220). In this case, the contents may be the results (or data according to the function execution results) obtained by executing a certain function (or a certain application program). Also, the data (or information) according to the function execution results may include a screen image (including various menu screen images) such as a user interface and/or graphic user interface, or the like, previously stored in the first storage unit 120, image data (including a still image, a video, and the like), voice data, information regarding the contents (or contents information), and the like.

Thus, the second storage unit 230 stores the received contents under the control of the second controller 240 (step S220).

Thereafter, based on the speed information, the second controller 240 determines whether such speed information is greater than a pre-set threshold value (step S230). Here, the speed information may be any one of speed information of the second mobile terminal 200 sensed by the sensor unit 210, speed information of the vehicle sensed by the sensor unit 210, and speed information included in status information of the vehicle received through the second communication unit 220. In this case, the vehicle status information may include speed information, engine on/off information, door opening/closing information, battery status information, and the like (step S230).

When the speed information is greater than the pre-set threshold value according to the determination results, the second controller 240 displays contents information included in the received contents and/or a previously stored or pre-set screen image stored in the second storage unit 230 on the second display unit 250 (step S240). In this case, the contents information may include at least one of the title, brief information, storage (creation) date, or the like. Also, the previously stored or pre-set screen image may include various menu screen images, or the like, generated based on the user interface and/or the graphic user interface.

Figure 7:
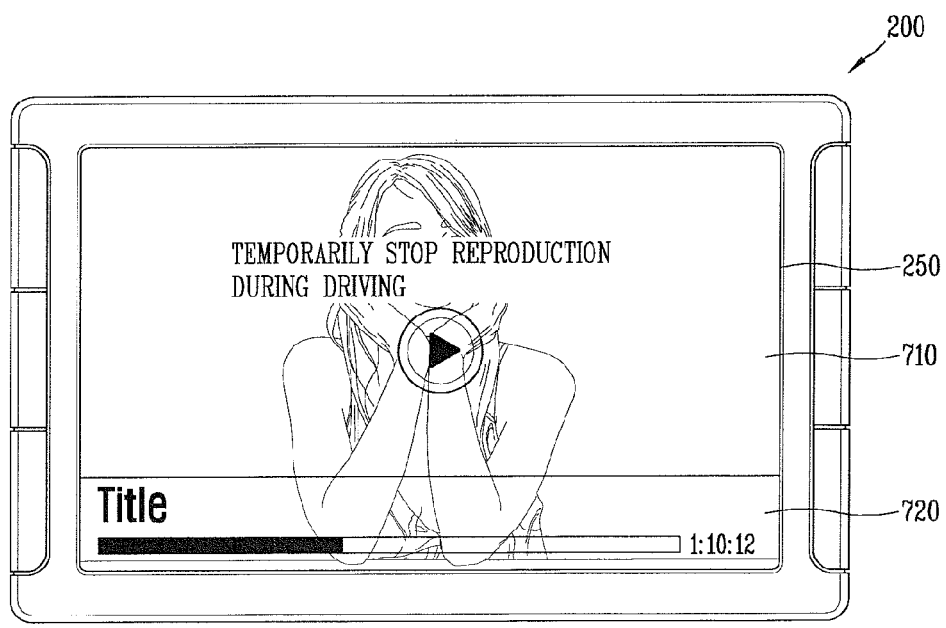
FIG. 7 is an overview of a display screen of a display unit of a mobile terminal according to an embodiment of the present invention.

For example, when the speed information is greater than the pre-set threshold value, as shown in FIG. 7, the second controller 240 determines that the vehicle 300 including the second mobile terminal 200 is running. Thus, in order to ensure safe driving, the second controller 240 limits an output of image data and/or voice data included in the received contents and displays a pre-set reproduction control user interface (or a reproduction control graphic user interface) 710 and/or contents information 720 (including brief guide information regarding the image data included in the received contents, or the like) included in the received contents on the second display unit 250 (step S240).

Also, when the speed information is smaller than or equal to the pre-set threshold value according to the determination results, the second controller 240 performs signal-processing on the received contents and outputs image data and/or voice data included in the signal-processed contents through the second display unit 250 and/or the second audio output unit 260 (step S250).

For example, when the speed information is smaller than or equal to the pre-set threshold value, the second controller 240 outputs the same contents (e.g., the video being outputted from the first mobile terminal 100 illustrated in FIG. 5), which is being outputted on the first mobile terminal 100 that transmitted such contents, also to the second mobile terminal 200 by using the second display unit 250 and/or the second audio output unit 260 (step S250).

In this manner, the contents being displayed on the first mobile terminal may be also displayed simultaneously on the second mobile terminal in communication with the first mobile terminal.

Figure 8:
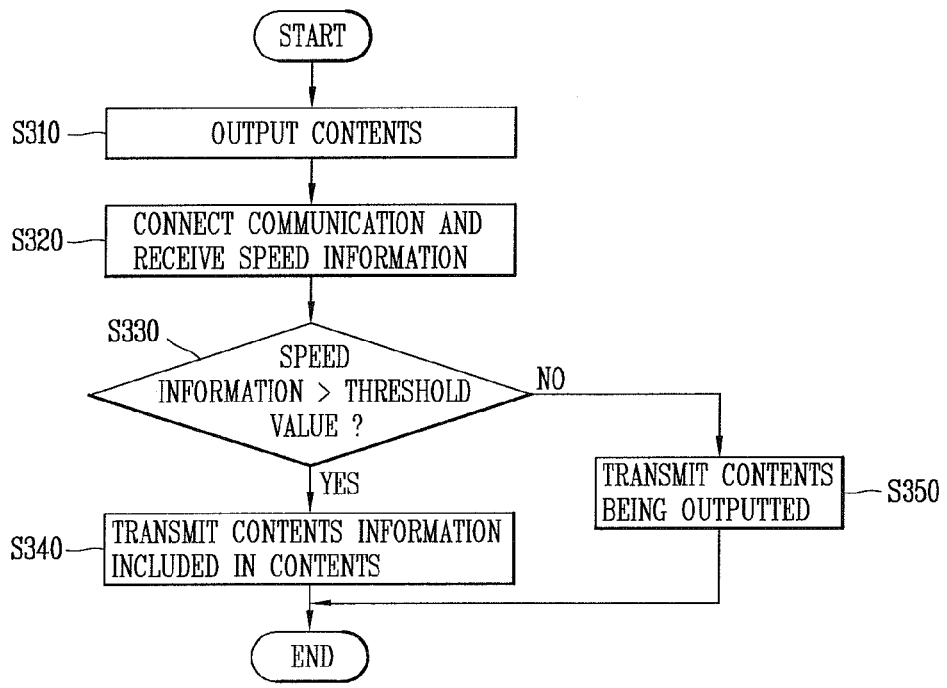
FIG. 8 is a flow chart illustrating the process of a method for controlling a mobile terminal according to a third embodiment of the present invention.

FIG. 8 is a flow chart illustrating the process of a method for controlling a mobile terminal according to a third embodiment of the present invention.

First, the first controller provides control to output certain contents previously stored in the first storage unit 120 through the first display unit 140 and/or the first audio output unit 150. In this case, the contents may be the results (or data according to the function execution results) obtained by executing a certain function (or a certain application program) previously stored in the first storage unit 120 (step S310). Also, the data (or information) according to the function execution results may include a screen image (including various menu screen images) such as a user interface and/or graphic user interface, or the like, previously stored in the first storage unit 120, image data (including a still image, a video, and the like), voice data, information regarding the contents (or contents information), and the like.

Also, when a pre-set event occurs such as when a pre-set button or a pre-set key is selected, when a pre-set time arrives, or the like, the first controller 130 may provide control to output the contents via the first display unit 140 and/or the first audio output unit 150.

For example, as shown in FIG. 5, the first controller 130 outputs a video 510 previously stored in the first storage unit 120 through the first display unit 140 and/or the first audio output unit 150. In this case, the first display unit 140 displays contents information (e.g., the title, brief information, a storage date, a reproduction time, or the like) 520 related to the displayed video 510 at a certain position (step S310).

Thereafter, the first communication unit 110 performs communication connection with the second mobile terminal 200 under the control of the first controller 130 (step S320). In this case, the first communication unit 110 may include a wired/wireless communication module. Here, as the wireless internet technique, a wireless local area network (WLAN), Wi-Fi, wireless broadband (Wibro), world interoperability for microwave access (WiMAX), high speed downlink packet access (HSDPA), IEEE 802.16, long-term evolution (LTE), a wireless mobile broadband service (WMBS), and the like, may be used. Also, a short-range communication technique may include Bluetooth™, Radio Frequency IDentification (RFID), Infrared Data Association (IrDA), Ultra-WideBand (UWB), ZigBee™, and the like. Also, a wired communication technique may include universal serial bus (USB) communication, or the like. The second mobile terminal 200 may be any one of various terminals such as a car audio device provided in the vehicle, a smartphone, a portable terminal, a mobile terminal, a telematics terminal, a PDA, a Wibro terminal, a navigation terminal, an AVN terminal, and the like.

Also, the first communication unit 110 receives speed information transmitted from the second mobile terminal 200. In this case, the speed information may include speed information of the second mobile terminal 200, speed information of the vehicle 300 including the second mobile terminal 200, speed information of the vehicle 300 adjacent to the second mobile terminal 200, and the like (step S320).

Thereafter, based on the received speed information, the first controller 130 determines whether such received speed information is greater than a pre-set threshold value (step S330).

When the speed information is greater than the pre-set threshold value according to the determination results, the first controller 130 transmits the contents information included in the contents, which is being outputted through the first display unit 140 and/or the first audio output unit 150, and/or the user interface (or graphic user interface) previously stored (or previously set) in the first storage unit 120 to the second mobile terminal 200 through the first communication unit 110 (step S340).

For example, when the speed information is greater than the pre-set threshold value, the first controller 130 the first controller 130 determines that the vehicle 300 including the second mobile terminal 200 is running. Thus, in order to ensure safe driving, rather than transmitting the contents including image data, voice data, or the like, the first controller 130 transmits contents information (including brief guide information regarding the image data included in the received contents, or the like) included in the contents and/or a reproduction control user interface (or a reproduction control graphic user interface) previously stored in the first storage unit 120 to the second mobile terminal 200 through the first communication unit 110 (step S340).

Also, when the speed information is smaller than or equal to the pre-set threshold value according to the determination results, the first controller 130 transmits the contents, being outputted through the first display unit 140 and/or the first audio output unit 150, to the second mobile terminal 200 through the first communication unit 110 (step S350).

For example, when the speed information is smaller than or equal to the pre-set threshold value, the first controller 130 determines that the vehicle 300 including the second mobile terminal 200 is stopped or parked, and transmits the contents, which is being outputted through the first display unit 140 and/or the first audio output unit 150, to the second mobile terminal 200 through the first communication unit 110 (step S350).

Figure 9:
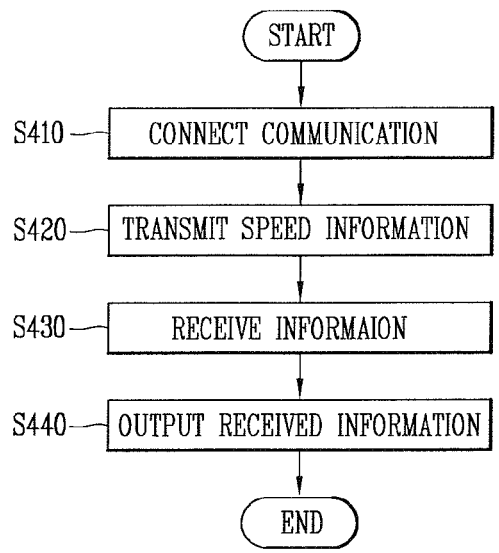
FIG. 9 is a flow chart illustrating the process of a method for controlling a mobile terminal according to a fourth embodiment of the present invention.

FIG. 9 is a flow chart illustrating the process of a method for controlling a mobile terminal according to a fourth embodiment of the present invention.

First, the second communication unit 220 performs communication connection with the first mobile terminal 100 under the control of the second controller 240 (step S410). In this case, the second communication unit 220 may include a wired/wireless communication module. Here, as the wireless internet technique, a wireless local area network (WLAN), Wi-Fi, wireless broadband (Wibro), world interoperability for microwave access (WiMAX), high speed downlink packet access (HSDPA), IEEE 802.16, long-term evolution (LTE), a wireless mobile broadband service (WMBS), and the like, may be used. Also, the short-range communication technique may include Bluetooth™, Radio Frequency IDentification (RFID), Infrared Data Association (IrDA), Ultra-WideBand (UWB), ZigBee™, and the like. Also, the wired communication technique may include universal serial bus (USB) communication, or the like. The first mobile terminal 100 may be any one of a smartphone, a portable terminal, a mobile terminal, a telematics terminal, a notebook computer, a digital broadcast terminal, a PDA (Personal Digital Assistant), a Wibro terminal, an IPTV (Internet Protocol Television) terminal, an AVN (Audio Video Navigation) terminal, a PMP (Portable Multimedia Player), a navigation terminal (vehicle navigation device), and the like.

Also, the second communication unit 220 performs communication connection between the second mobile terminal 200 and the vehicle 300 by using a controller area network (CAN), a vehicle network system within the vehicle 300 including the second mobile terminal 200 mounted therein, or a short-range communication network. Also, the second communication unit 220 may perform communication connection between the second mobile terminal 200 and the vehicle 300 by using a controller area network (CAN) within the vehicle 300 adjacent to the second mobile terminal 200, or a short-range communication network (step S410).

Thereafter, the second controller 240 transmits speed information to the first mobile terminal 100 through the second communication unit 220 (step S420). Here, the speed information may be any one of speed information of the second mobile terminal 200 sensed by the sensor unit 210, speed information of the vehicle sensed by the sensor unit 210, and speed information included in status information of the vehicle received through the second communication unit 220. In this case, the vehicle status information may include speed information, engine on/off information, door opening/closing information, battery status information, and the like.

Also, when a pre-set event occurs such as when a pre-set button or a pre-set key is selected, when a pre-set time arrives, when the engine of the vehicle is started, or the like, the second controller 240 may transmit the speed information of the vehicle to the first mobile terminal 100 through the second communication unit 220 (step S420).

Thereafter, in response to the speed information transmitted to the first mobile terminal 100, the second controller 240 receives information transmitted from the first mobile terminal 100 through the second communication unit 220 (step S430). In this case, the received information may include contents, information regarding the contents (or contents information0, a user interface/graphic user interface, a control signal, and the like. In this case, the contents may be the results (or data according to the function execution results) obtained by executing a certain function (or a certain application program). Also, the data (or information) according to the function execution results may include a screen image (including various menu screen images) such as a user interface and/or graphic user interface, or the like, previously stored in the first storage unit 120, image data (including a still image, a video, and the like), voice data, information regarding the contents (or contents information), and the like.

Also, the second storage unit 230 stores the received information under the control of the second controller 240 (step S430).

Thereafter, the second controller 240 outputs the received information through the second display unit 250 and/or the second audio output unit 260 (step S440). In this case, the received information may include any one of contents information, a certain pre-set screen image (which includes, for example, a reproduction control user interface/graphic user interface, or the like), and contents.

For example, when the contents information and/or reproduction control user interface are/is included in the received information, the second controller 240 determines that the vehicle 300 including the second mobile terminal 200 is running. Thus, in order to ensure safe driving, the second controller 240 displays the received contents information 720 and/or reproduction control user interface 710 as shown in FIG. 7 on the second display unit 250. Here, the contents information includes brief guide information regarding the contents being outputted from the first mobile terminal 100.

In another example, when the received information includes contents information, the second controller 240 determines that the vehicle 300 including the second mobile terminal 200 is running. Thus, in order to ensure safe driving, the second controller 240 displays the received contents information and/or reproduction control user interface (or reproduction control graphic user interface) previously stored in the second storage 230 on the second display unit 250. Here, the contents information includes brief guide information regarding the contents being outputted from the first mobile terminal 100.

In another example, when the received information includes the contents, the second controller 240 determines that the vehicle 300 including the second mobile terminal 200 is stopped or parked, and outputs content of the same contents (e.g., the video being outputted from the first mobile terminal 100 illustrated in FIG. 5), which is being outputted from the first mobile terminal 100 that has transmitted the contents, also from the second mobile terminal 200 by using the second display unit 250 and/or the second audio output unit 260 (step S440).

In this manner, the output of certain contents transmitted from the first mobile terminal can be controlled according to the operational state of the vehicle including the second mobile terminal.

Figure 10:
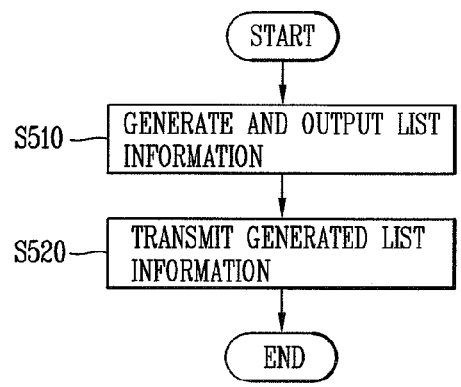
FIG. 10 is a flow chart illustrating the process of a method for controlling a mobile terminal according to a fifth embodiment of the present invention.

FIG. 10 is a flow chart illustrating the process of a method for controlling a mobile terminal according to a fifth embodiment of the present invention.

First, when a pre-set menu screen button is selected, the first controller 130 generates list information regarding one or more application programs previously stored in the first storage unit 120 according to the selected menu screen button. In this case, the generated list information may include information regarding an application program name (or a package name), an application program type, an application program icon/emoticon, or the like.

Also, the first controller 130 displays the generated list information on the first display unit 140 (step S510).

Figure 11:
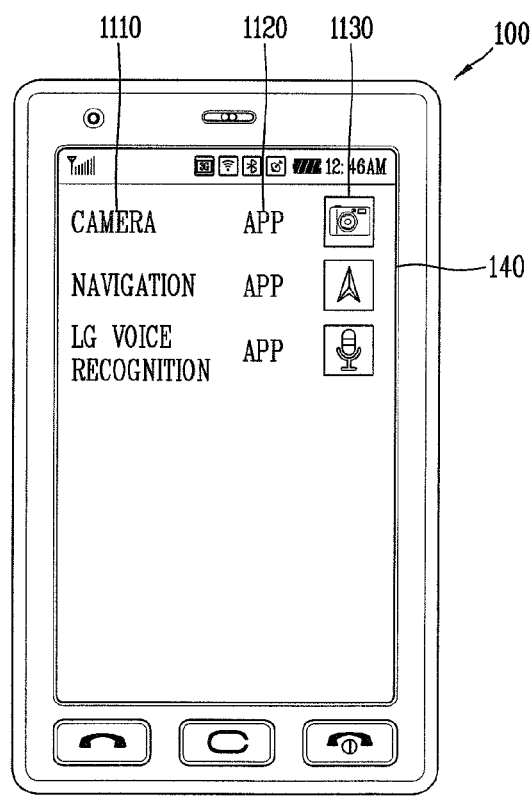
FIG. 11 is an overview of a display screen illustrating examples of list information according to an embodiment of the present invention.

For example, as shown in FIG. 11, the first controller 130 displays the generated list information 110 on the first display unit 140. In this case, the first display unit 140 displays list information 1100 including an application program name 1110, an application program type 1120, and an application program icon/emoticon 1130 (step S510).

Thereafter, the first controller 130 transmits the generated list information to the second mobile terminal 200 in communication through the first communication unit 110 (step S520). In this case, the first communication unit 110 may include a wired/wireless communication module. Here, as the wireless internet technique, a wireless local area network (WLAN), Wi-Fi, wireless broadband (Wibro), world interoperability for microwave access (WiMAX), high speed downlink packet access (HSDPA), IEEE 802.16, long-term evolution (LTE), a wireless mobile broadband service (WMBS), and the like, may be used. Also, a short-range communication technique may include Bluetooth™, Radio Frequency IDentification (RFID), Infrared Data Association (IrDA), Ultra-WideBand (UWB), ZigBee™, and the like. Also, a wired communication technique may include universal serial bus (USB) communication, or the like. The second mobile terminal 200 may be any one of various terminals such as a car audio device provided in the vehicle, a smartphone, a portable terminal, a mobile terminal, a telematics terminal, a PDA, a Wibro terminal, a navigation terminal, an AVN terminal, and the like (step S520).

Figure 12:
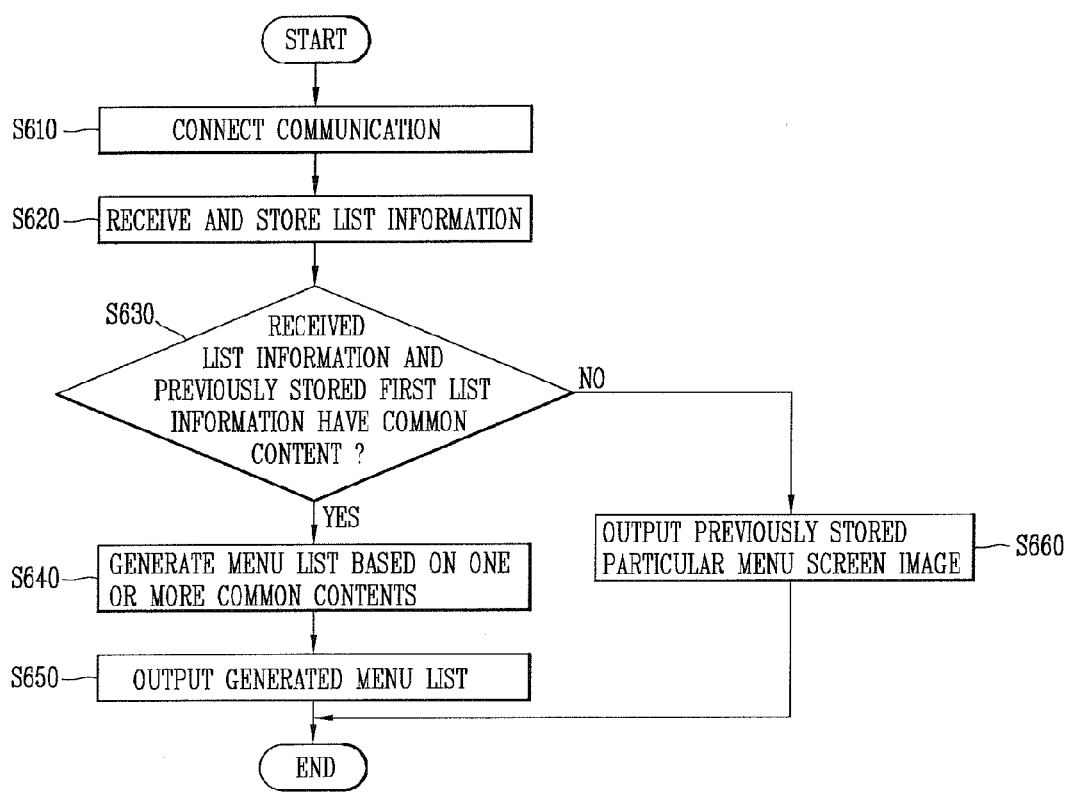
FIG. 12 is a flow chart illustrating the process of a method for controlling a mobile terminal according to a sixth embodiment of the present invention.

FIG. 12 is a flow chart illustrating the process of a method for controlling a mobile terminal according to a sixth embodiment of the present invention.

First, the second communication unit 220 performs communication connection with the first mobile terminal 100 under the control of the second controller 240 (step S610). In this case, the second communication unit 220 may include a wired/wireless communication module. Here, as the wireless internet technique, a wireless local area network (WLAN), Wi-Fi, wireless broadband (Wibro), world interoperability for microwave access (WiMAX), high speed downlink packet access (HSDPA), IEEE 802.16, long-term evolution (LTE), a wireless mobile broadband service (WMBS), and the like, may be used. Also, the short-range communication technique may include Bluetooth™, Radio Frequency IDentification (RFID), Infrared Data Association (IrDA), Ultra-WideBand (UWB), ZigBee™, and the like. Also, the wired communication technique may include universal serial bus (USB) communication, or the like. The first mobile terminal 100 may be any one of a smartphone, a portable terminal, a mobile terminal, a telematics terminal, a notebook computer, a digital broadcast terminal, a PDA (Personal Digital Assistant), a Wibro terminal, an IPTV (Internet Protocol Television) terminal, an AVN (Audio Video Navigation) terminal, a PMP (Portable Multimedia Player), a navigation terminal (vehicle navigation device), and the like (step S610).

Thereafter, the second communication unit 220 receives list information transmitted from the first mobile terminal 100. In this case, the list information may include information regarding an application program name (or a package name), an application program type, an application program icon/emoticon, or the like (step S620).

Also, the second storage unit 230 stores the received list information under the control of the second controller 240 (step S620).

Thereafter, the second controller 240 searches for (or checks) an application program name corresponding to application program names included in the first list information previously stored (or previously set) in the second storage unit 230 among the application program names included in the received list information (step S630).

Namely, the second controller 240 searches for an application program name commonly included in the application program names included in the received list information and the application names included in the first list information (step S630).

According to the search results, the second controller 240 generates a menu list based on one or more application program names searched correspondingly according to the application program names included in the previously stored first list information among the application program names included in the received list information (step S640).

For example, when the received list information includes a camera program name, a navigation program name, and a predetermined voice recognition and search program name and the previously stored first list information includes a navigation program name, a predetermined voice recognition and search program name, and a map search program name, and the like, the second controller 240 may generate a menu list including the navigation program name and the predetermined voice recognition and search program name based on the navigation program name and the predetermined voice recognition and search program name commonly included in the received list information and the previously stored first list information in order to reconfigure a menu list only with the pre-set program names which can be controlled by the second mobile terminal 200. In this case, the generated menu list includes information regarding an application program name, an application program type, and an application program icon/emoticon, and the like (step S640).

Thereafter, the second controller 240 displays the generated menu list on the second display unit 250 (step S650).

For example, the second controller 240 displays the menu list including the navigation program name and the predetermined voice recognition and search program name newly generated with the program names which can be controlled by the second mobile terminal 200, apart from the list information including the camera program name, the navigation program name, and the predetermined voice recognition and search program name displayed on the first mobile terminal 100 that has transmitted the list information (step S650).

Also, according to the search results, when there is no application program name searched to correspond to the application program names included in the previously stored first list information among the application programs included in the received list information, the second controller 240 displays a particular user interface/particular graphic user interface previously stored in the second storage unit 230 (step S660).

For example, when there is no application program name searched to correspond to the application program names included in the previously stored first list information among the application programs included in the received list information, the second controller 240 determines that there is no at least one pre-set program which can be controlled by the second mobile terminal 200 in the programs included in the received list information, and displays a particular menu screen image previously stored in the second storage unit 230 on the second display unit 250 (step S660).

In this manner, the information regarding one or application programs which can be controlled by the second mobile terminal in communication with the first mobile terminal among the plurality of application programs which can be controlled by the first mobile terminal can be provided.

Figure 13:
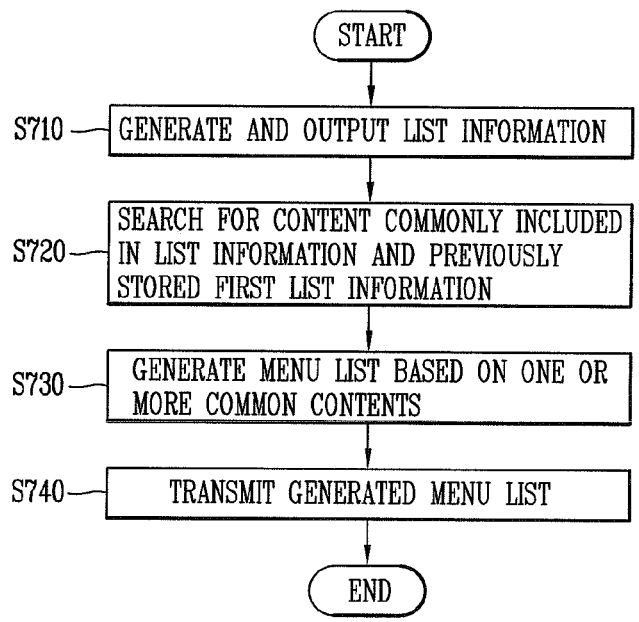
FIG. 13 is a flow chart illustrating the process of a method for controlling a mobile terminal according to an eighth embodiment of the present invention.

FIG. 13 is a flow chart illustrating the process of a method for controlling a mobile terminal according to an eighth embodiment of the present invention.

First, when a pre-set menu screen button is selected, the first controller 130 generates list information regarding one or more application programs previously stored in the first storage unit 120 according to the selected menu screen button (step S710). In this case, the generated list information may include information regarding an application program name (or a package name), an application program type, an application program icon/emoticon, or the like.

Also, the first controller 130 displays the generated list information on the first display unit 140.

For example, as shown in FIG. 11, the first controller 130 displays the generated list information 110 on the first display unit 140. In this case, the first display unit 140 displays list information 1100 including an application program name 1110, an application program type 1120, and an application program icon/emoticon 1130 (step S710).

Thereafter, the first controller 130 searches for (or checks) an application program name corresponding to application program names included in the first list information previously stored (or previously set) in the first storage unit 120 among the application program names included in the list information (step S720). In this case, the first list information may include one or more application program names that can be controlled by a certain mobile terminal (e.g., the second mobile terminal 200).

Namely, the first controller 130 searches for an application program name commonly included in the application program names included in the list information and the application names included in the first list information (step S720).

Thereafter, according to the search results, the first controller 130 generates a menu list based on one or more application program names searched correspondingly according to the application program names included in the previously stored first list information among the application program names included in the list information (step S730).

For example, when the list information includes a camera program name, a navigation program name, and a predetermined voice recognition and search program name and the previously stored first list information includes a navigation program name, a predetermined voice recognition and search program name, and a map search program name, and the like, the first controller 130 may generate a menu list including the navigation program name and the predetermined voice recognition and search program name based on the navigation program name and the predetermined voice recognition and search program name commonly included in the list information and the first list information in order to reconfigure a menu list only with the pre-set program names which can be controlled by the certain mobile terminal (e.g., the second mobile terminal 200) (step S730).

Thereafter, the first controller 130 transmits the generated menu list to the certain mobile terminal (e.g., the second mobile terminal 200) in communication therewith through the first communication unit 110 (step S740). In this case, the first communication unit 110 may include a wired/wireless communication module. Here, as the wireless internet technique, a wireless local area network (WLAN), Wi-Fi, wireless broadband (Wibro), world interoperability for microwave access (WiMAX), high speed downlink packet access (HSDPA), IEEE 802.16, long-term evolution (LTE), a wireless mobile broadband service (WMBS), and the like, may be used. Also, a short-range communication technique may include Bluetooth™, Radio Frequency IDentification (RFID), Infrared Data Association (IrDA), Ultra-WideBand (UWB), ZigBee™, and the like. Also, a wired communication technique may include universal serial bus (USB) communication, or the like (step S740).

Figure 14:
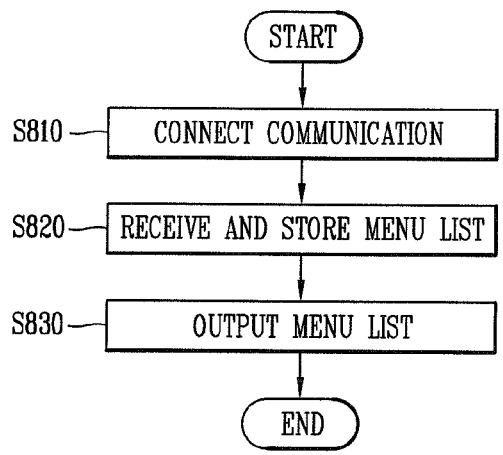
FIG. 14 is a flow chart illustrating the process of a method for controlling a mobile terminal according to a sixth embodiment of the present invention.

FIG. 14 is a flow chart illustrating the process of a method for controlling a mobile terminal according to a sixth embodiment of the present invention;

First, the second communication unit 220 performs communication connection with the first mobile terminal 100 under the control of the second controller 240 (step S810). In this case, the second communication unit 220 may include a wired/wireless communication module. Here, as the wireless internet technique, a wireless local area network (WLAN), Wi-Fi, wireless broadband (Wibro), world interoperability for microwave access (WiMAX), high speed downlink packet access (HSDPA), IEEE 802.16, long-term evolution (LTE), a wireless mobile broadband service (WMBS), and the like, may be used. Also, the short-range communication technique may include Bluetooth™, Radio Frequency IDentification (RFID), Infrared Data Association (IrDA), Ultra-WideBand (UWB), ZigBee™, and the like. Also, the wired communication technique may include universal serial bus (USB) communication, or the like. The first mobile terminal 100 may be any one of a smartphone, a portable terminal, a mobile terminal, a telematics terminal, a notebook computer, a digital broadcast terminal, a PDA (Personal Digital Assistant), a Wibro terminal, an IPTV (Internet Protocol Television) terminal, an AVN (Audio Video Navigation) terminal, a PMP (Portable Multimedia Player), a navigation terminal (vehicle navigation device), and the like.

Thereafter, the second communication unit 220 receives a menu list transmitted from the first mobile terminal 100 (step S820). In this case, the menu list may be a menu list generated based on application program names which can be controlled by the second mobile terminal 200 among the plurality of application programs stored in the first mobile terminal 100. Also, the menu list includes an application program name, an application program type, an application program icon/emoticon, and the like.

Also, the second storage unit 230 stores the received menu list under the control of the second controller 240 (step S820).

Thereafter, the second controller 240 displays the menu list including the application program name, the application program type, the application program icon/emoticon, and the like, on the second display unit 250 (step S830).

For example, in a state in which the plurality of application program names stored in the first mobile terminal 100 are being displayed on the first mobile terminal 100, the second controller 240 displays the menu list, which has been generated based on the application program names (including, for example, the navigation program name, and the like) which can be controlled by the second mobile terminal 200 among the plurality of application programs stored in the first mobile terminal 100, on the second display unit 250 (step S830).

Figure 15:
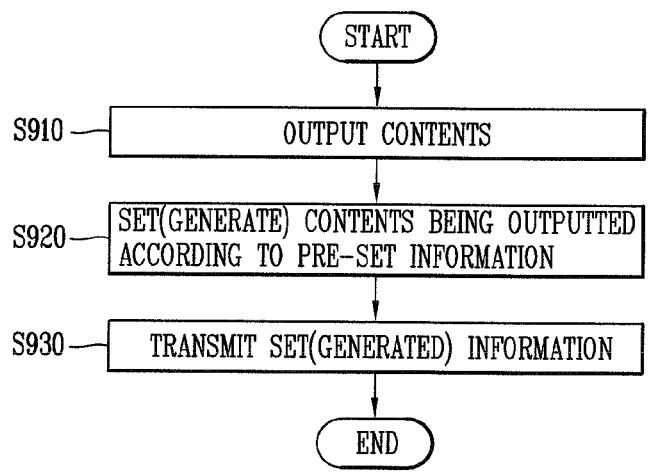
FIG. 15 is a flow chart illustrating the process of a method for controlling a mobile terminal according to a ninth embodiment of the present invention.

FIG. 15 is a flow chart illustrating the process of a method for controlling a mobile terminal according to a ninth embodiment of the present invention.

First, the first controller provides control to output certain contents previously stored in the first storage unit 120 through the first display unit 140 and/or the first audio output unit 150 (step S910). In this case, the contents may be the results (or data according to the function execution results) obtained by executing a certain function (or a certain application program) previously stored in the first storage unit 120. Also, the data (or information) according to the function execution results may include a screen image (including various menu screen images) such as a user interface and/or graphic user interface, or the like, previously stored in the first storage unit 120, image data (including a still image, a video, and the like), voice data, information regarding the contents (or contents information), and the like.

Also, when a pre-set event occurs such as when a pre-set button or a pre-set key is selected, when a pre-set time arrives, or the like, the first controller 130 may provide control to output the contents via the first display unit 140 and/or the first audio output unit 150.

For example, the first controller 130 displays a menu screen image generated by using the graphic user interface previously stored in the first storage unit 120 on the first display unit 140 (step S910).

Thereafter, the first controller 130 converts the contents outputted through the first display unit 140 and/or the first audio output unit 150 such that the contents fit the configuration information of a display unit and/or an audio output unit of a certain mobile terminal (e.g., the second mobile terminal 200) based on the video codec configuration information (including, for example, codec configuration information related to screen setting, audio codec configuration information, and the like), the characteristic information of the certain mobile terminal (e.g., the second mobile terminal 200) previously stored in the first storage unit 120, or generate new contents (step S920).

For example, the first controller 130 may magnify or reduce the space between menus (i.e., one or more menus) included in the menu screen displayed on the first display unit 140, magnify or reduce the size of characters of text included in the menu screen, or add a dedicated graphic user interface or a dedicated user interface to a certain area of the menu screen, based on the video codec configuration information, the characteristic information of the second mobile terminal 200 previously stored in the first storage unit 120, to generate a new menu screen image (step S920).

Thereafter, the first controller 130 transmits the generated information (or the newly created contents) to the certain mobile terminal (e.g., the second mobile terminal 200) in communication therewith through the first communication unit 110 (step S930). In this case, the first communication unit 110 may include a wired/wireless communication module. Here, as the wireless internet technique, a wireless local area network (WLAN), Wi-Fi, wireless broadband (Wibro), world interoperability for microwave access (WiMAX), high speed downlink packet access (HSDPA), IEEE 802.16, long-term evolution (LTE), a wireless mobile broadband service (WMBS), and the like, may be used. Also, a short-range communication technique may include Bluetooth™, Radio Frequency IDentification (RFID), Infrared Data Association (IrDA), Ultra-WideBand (UWB), ZigBee™, and the like. Also, a wired communication technique may include universal serial bus (USB) communication, or the like (step S930).

Figure 16:
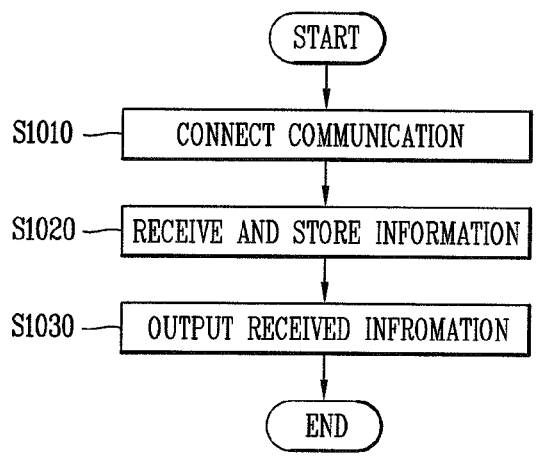
FIG. 16 is a flow chart illustrating the process of a method for controlling a mobile terminal according to a tenth embodiment of the present invention.

FIG. 16 is a flow chart illustrating the process of a method for controlling a mobile terminal according to a tenth embodiment of the present invention.

First, the second communication unit 220 performs communication connection with the first mobile terminal 100 under the control of the second controller 240 (step S1010). In this case, the second communication unit 220 may include a wired/wireless communication module. Here, as the wireless internet technique, a wireless local area network (WLAN), Wi-Fi, wireless broadband (Wibro), world interoperability for microwave access (WiMAX), high speed downlink packet access (HSDPA), IEEE 802.16, long-term evolution (LTE), a wireless mobile broadband service (WMBS), and the like, may be used. Also, the short-range communication technique may include Bluetooth™, Radio Frequency IDentification (RFID), Infrared Data Association (IrDA), Ultra-WideBand (UWB), ZigBee™, and the like. Also, the wired communication technique may include universal serial bus (USB) communication, or the like. The first mobile terminal 100 may be any one of a smartphone, a portable terminal, a mobile terminal, a telematics terminal, a notebook computer, a digital broadcast terminal, a PDA (Personal Digital Assistant), a Wibro terminal, an IPTV (Internet Protocol Television) terminal, an AVN (Audio Video Navigation) terminal, a PMP (Portable Multimedia Player), a navigation terminal (vehicle navigation device), and the like (step S1010).

Thereafter, the second communication unit 220 receives information transmitted from the first mobile terminal 100 (step S1020). In this case, the information may be information that is generated by adjusting the contents, which were outputted from the first mobile terminal 100, according to the characteristic information, namely, the video codec configuration state, of the second mobile terminal 200. The information may include a screen image (including various menu screen images) such as a certain user interface or a graphic user interface, image data (including still image, video, or the like), audio data, information regarding the contents (or contents information), and the like.

Also, the second storage unit 230 stores the received information under the control of the second controller 240 (step S1020).

Thereafter, the second controller 240 outputs the received information through the second display unit 250 and/or the second audio output unit 260 (step S1030).

For example, in a state in which the menu screen image corresponding to the received information is output on the first mobile terminal 100, the information including the menu screen image generated according to the setting environment of the second mobile terminal 200 is output on the second mobile terminal 200. In this case, compared with the menu screen image displayed on the first mobile terminal 100, the generated menu screen image may be a menu screen image in which the space between menus is increased, the size of characteristics is increased, and a dedicated graphic interface is added (step S1030).

In this manner, the contents being displayed on the first mobile terminal may be newly set according to the configuration state (or setting state) of the second mobile terminal in communication therewith and the newly configured contents can be provided to the second mobile terminal.

Figure 17:
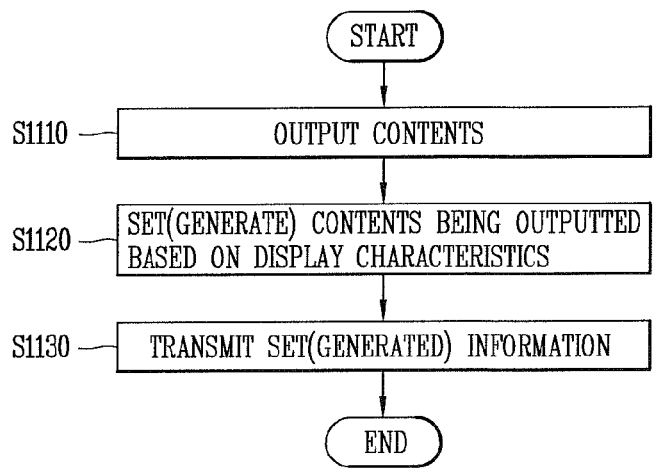
FIG. 17 is a flow chart illustrating the process of a method for controlling a mobile terminal according to an eleventh embodiment of the present invention.

FIG. 17 is a flow chart illustrating the process of a method for controlling a mobile terminal according to an eleventh embodiment of the present invention.

First, the first controller provides control to output certain contents previously stored in the first storage unit 120 through the first display unit 140 and/or the first audio output unit 150 (step S1110). In this case, the contents may be the results (or data according to the function execution results) obtained by executing a certain function (or a certain application program) previously stored in the first storage unit 120. Also, the data (or information) according to the function execution results may include a screen image (including various menu screen images) such as a user interface and/or graphic user interface, or the like, previously stored in the first storage unit 120, image data (including a still image, a video, and the like), voice data, information regarding the contents (or contents information), and the like.

Also, when a pre-set event occurs such as when a pre-set button or a pre-set key is selected, when a pre-set time arrives, or the like, the first controller 130 may provide control to output the contents via the first display unit 140 and/or the first audio output unit 150.

Figure 18:
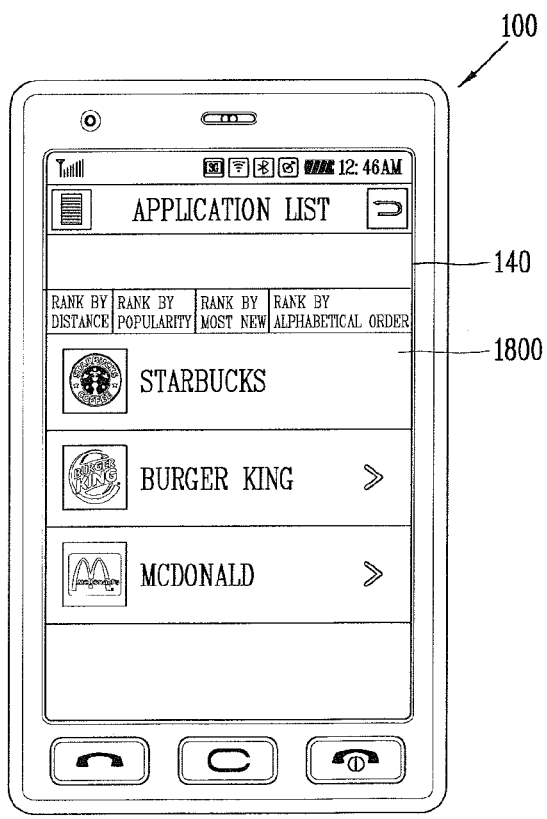
FIG. 18 is an overview of a display screen of a display unit of a mobile terminal according to an embodiment of the present invention.

For example, as shown in FIG. 18, the first controller 130 displays a menu screen image 1800 generated by using the graphic user interface previously stored in the first storage unit 120, on the first display unit 140 (step S1110).

Thereafter, the first controller 130 generates new contents based on the display characteristics, characteristic information of the certain mobile terminal (e.g., the second mobile terminal 200) previously stored in the first storage unit 120, and the contents outputted through the first display unit 140 and/or the first voice output unit 150 (step S1120). In this case, the display characteristics of the terminal include horizontal display characteristics, vertical display characteristics, or the like, according to the ratio between the width and length of the screen set according to the characteristics of the display unit of each terminal.

Namely, based on the display characteristics, i.e., characteristic information of the certain mobile terminal (e.g., the second mobile terminal 200) previously stored in the first storage unit 120, the first controller 130 newly generates the contents, which is output through the first display unit 140 and/or the first audio output unit 150, such that the contents fits the display characteristics of the mobile terminal.

For example, based on the display characteristics, characteristic information of the second mobile terminal 200 previously stored in the first storage unit 120 (e.g., the second mobile terminal 200 has horizontal display characteristics that its width is longer), the first controller 130 generates a new menu screen image (e.g., a menu screen image having horizontal display characteristics that the width is longer) from the menu screen image (e.g., the menu screen image having vertical display characteristics that its length is longer) displayed on the first display unit 140 (step S1120).

Thereafter, the first controller 130 transmits the generated information (or the newly created contents) to the second mobile terminal 200 in communication therewith through the first communication unit 110 (step S1130). In this case, the first communication unit 110 may include a wired/wireless communication module. Here, as the wireless internet technique, a wireless local area network (WLAN), Wi-Fi, wireless broadband (Wibro), world interoperability for microwave access (WiMAX), high speed downlink packet access (HSDPA), IEEE 802.16, long-term evolution (LTE), a wireless mobile broadband service (WMBS), and the like, may be used. Also, a short-range communication technique may include Bluetooth™, Radio Frequency IDentification (RFID), Infrared Data Association (IrDA), Ultra-WideBand (UWB), ZigBee™, and the like. Also, a wired communication technique may include universal serial bus (USB) communication, or the like (step S1130).

Figure 19:
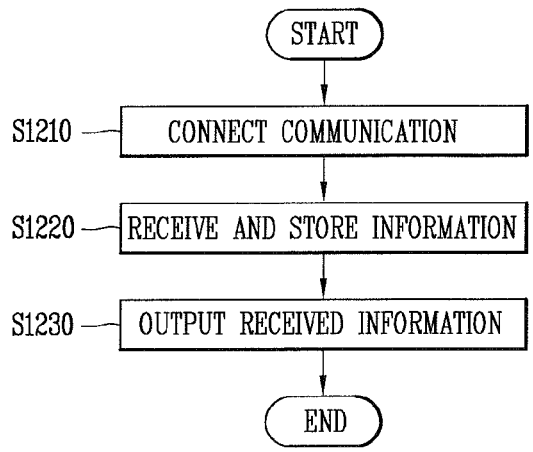
FIG. 19 is a flow chart illustrating the process of a method for controlling a mobile terminal according to a twelfth embodiment of the present invention.

FIG. 19 is a flow chart illustrating the process of a method for controlling a mobile terminal according to a twelfth embodiment of the present invention.

First, the second communication unit 220 performs communication connection with the first mobile terminal 100 under the control of the second controller 240 (step S1210). In this case, the second communication unit 220 may include a wired/wireless communication module. Here, as the wireless internet technique, a wireless local area network (WLAN), Wi-Fi, wireless broadband (Wibro), world interoperability for microwave access (WiMAX), high speed downlink packet access (HSDPA), IEEE 802.16, long-term evolution (LTE), a wireless mobile broadband service (WMBS), and the like, may be used. Also, the short-range communication technique may include Bluetooth™, Radio Frequency IDentification (RFID), Infrared Data Association (IrDA), Ultra-WideBand (UWB), ZigBee™, and the like. Also, the wired communication technique may include universal serial bus (USB) communication, or the like. The first mobile terminal 100 may be any one of a smartphone, a portable terminal, a mobile terminal, a telematics terminal, a notebook computer, a digital broadcast terminal, a PDA (Personal Digital Assistant), a Wibro terminal, an IPTV (Internet Protocol Television) terminal, an AVN (Audio Video Navigation) terminal, a PMP (Portable Multimedia Player), a navigation terminal (vehicle navigation device), and the like (step S1210).

Thereafter, the second communication unit 220 receives information transmitted from the first mobile terminal 100 (step S1220). In this case, the information may be information that is generated by adjusting the contents, which were outputted from the first mobile terminal 100, according to the characteristic information, namely, display characteristics, of the second mobile terminal 200. The information may include a screen image (including various menu screen images) such as a certain user interface or a graphic user interface, image data (including still image, video, or the like), audio data, information regarding the contents (or contents information), and the like. Here, the display characteristics of the terminal include horizontal display characteristics, vertical display characteristics, or the like, according to the ratio between the width and length of the screen set according to the characteristics of the display unit of each terminal.

Also, the second storage unit 230 stores the received information under the control of the second controller 240 (step S1220).

Thereafter, the second controller 240 outputs the received information through the second display unit 250 and/or the second audio output unit 260 (step S1230).

Figure 20:
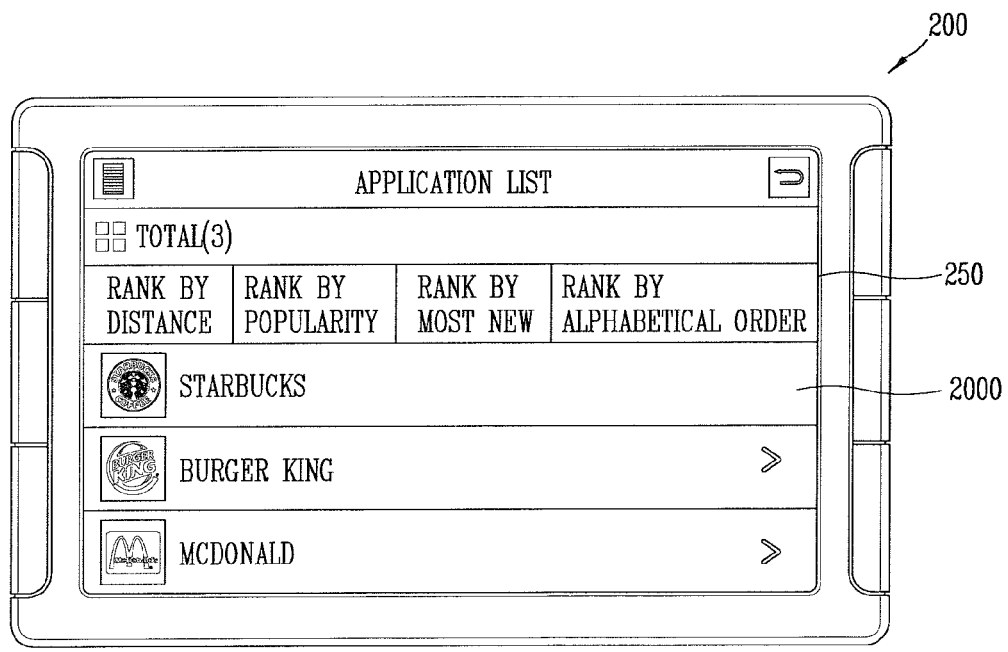
FIG. 20 is an overview of a display screen of a display unit of a mobile terminal according to an embodiment of the present invention.

For example, in a state in which the menu screen image corresponding to the received information is output in a vertical display form on the first mobile terminal 100 (e.g., the menu screen image 1800 in FIG. 18), the information including the menu screen image generated according to the display characteristics (e.g., a horizontal display form) of the second mobile terminal 200 is output in a horizontal display form on the second mobile terminal 200 as shown in FIG. 20 (step S1230).

In this manner, the contents being displayed on the first mobile terminal may be newly set according to the display characteristics of the second mobile terminal in communication therewith and the newly configured contents can be provided to the second mobile terminal.

Figure 21:
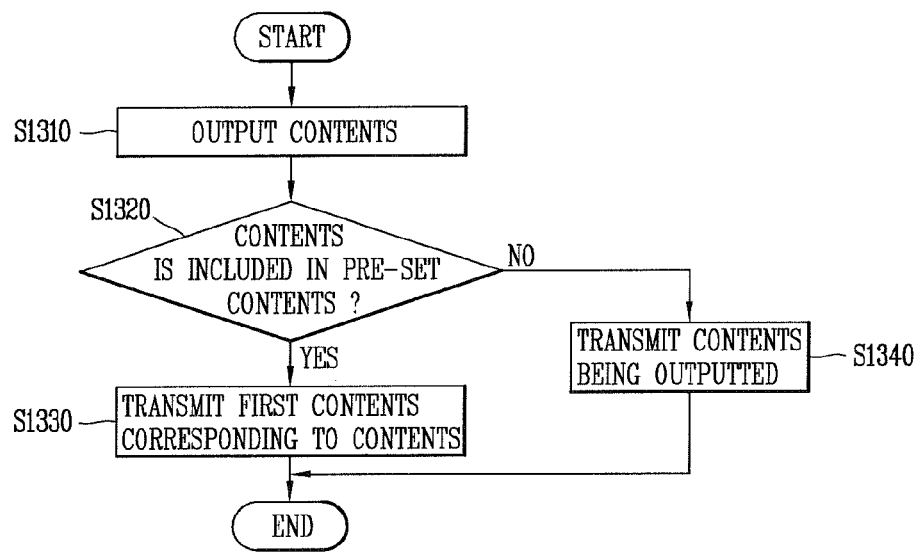
FIG. 21 is a flow chart illustrating the process of a method for controlling a mobile terminal according to a thirteenth embodiment of the present invention.

FIG. 21 is a flow chart illustrating the process of a method for controlling a mobile terminal according to a thirteenth embodiment of the present invention.

First, the first controller provides control to output certain contents previously stored in the first storage unit 120 through the first display unit 140 and/or the first audio output unit 150 (step S1310). In this case, the contents may be the results (or data according to the function execution results) obtained by executing a certain function (or a certain application program) previously stored in the first storage unit 120. Also, the data (or information) according to the function execution results may include a screen image (including various menu screen images) such as a user interface and/or graphic user interface, or the like, previously stored in the first storage unit 120, image data (including a still image, a video, and the like), voice data, information regarding the contents (or contents information), and the like.

Also, when a pre-set event occurs such as when a pre-set button or a pre-set key is selected, when a pre-set time arrives, or the like, the first controller 130 may provide control to output the contents via the first display unit 140 and/or the first audio output unit 150.

Figure 22:
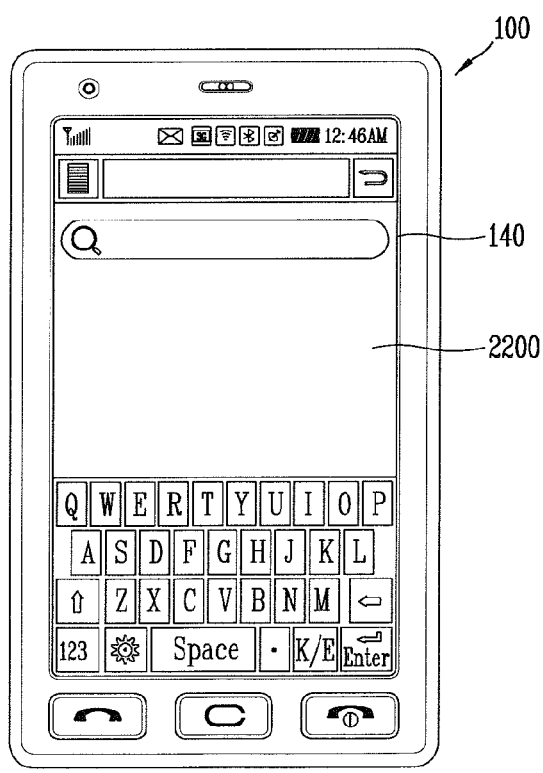
FIG. 22 is an overview of a display screen of a display unit of a mobile terminal according to an embodiment of the present invention.

For example, as shown in FIG. 22, the first controller 130 executes a text message function and display a text message screen image 2200 according to the execution of the text message function on the first display unit 140 (step S1310).

Thereafter, the first controller 130 determines whether the output contents is included in particular contents previously set in the first storage unit 120 (step S1320). In this case, the pre-set particular contents may be contents for which a security function (or its usage function is limited) has been set by the user. The particular contents may be output only on the first mobile terminal and a transmission, output, or the like, of the particular contents to a different mobile terminal is limited (step S1320).

When the output contents is included in the pre-set particular contents according to the determination results, the first controller 130 transmits first contents which is previously stored or previously set in the first storage unit 120 and corresponds to the pre-set particular contents, to the second mobile terminal 200 in communication through the first communication unit 110 (step S1330).

For example, when the contents including a text message screen image displaying personal content is included in the pre-set particular contents, the first controller 130 transmits image data which is previously set in the first storage unit 120 and corresponds to the pre-set contents (or the text message screen image) to the second mobile terminal 200 through the first communication unit 110 (step S1330).

Also, when the output contents is not included in the pre-set particular contents according to the determination results, the first controller 130 transmits the contents, being outputted through the first display unit 140 and/or the first audio output unit 150, to the second mobile terminal 200 through the first communication unit 110 (step S1340).

For example, when a certain still image displayed on the first display unit 140 is not included in the pre-set particular contents, the first controller 130 transmits the still image displayed on the first display unit 140 to the second mobile terminal 200 through the first communication unit 110 (step S1340).

Figure 23:
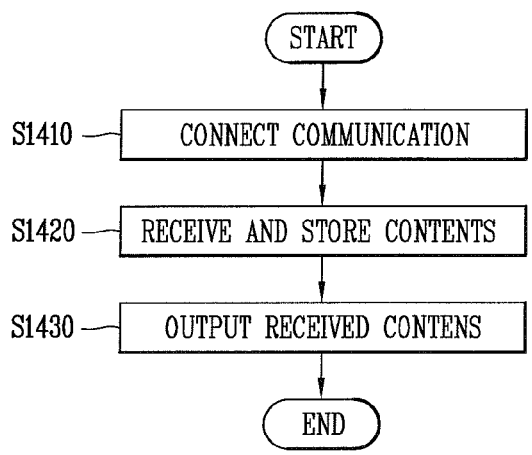
FIG. 23 is a flow chart illustrating the process of a method for controlling a mobile terminal according to a fourteenth embodiment of the present invention.

FIG. 23 is a flow chart illustrating the process of a method for controlling a mobile terminal according to a fourteenth embodiment of the present invention.

First, the second communication unit 220 performs communication connection with the first mobile terminal 100 under the control of the second controller 240 (step S1410). In this case, the second communication unit 220 may include a wired/wireless communication module. Here, as the wireless internet technique, a wireless local area network (WLAN), Wi-Fi, wireless broadband (Wibro), world interoperability for microwave access (WiMAX), high speed downlink packet access (HSDPA), IEEE 802.16, long-term evolution (LTE), a wireless mobile broadband service (WMBS), and the like, may be used. Also, the short-range communication technique may include Bluetooth™, Radio Frequency IDentification (RFID), Infrared Data Association (IrDA), Ultra-WideBand (UWB), ZigBee™, and the like. Also, the wired communication technique may include universal serial bus (USB) communication, or the like. The first mobile terminal 100 may be any one of a smartphone, a portable terminal, a mobile terminal, a telematics terminal, a notebook computer, a digital broadcast terminal, a PDA (Personal Digital Assistant), a Wibro terminal, an IPTV (Internet Protocol Television) terminal, an AVN (Audio Video Navigation) terminal, a PMP (Portable Multimedia Player), a navigation terminal (vehicle navigation device), and the like (step S1410).

Thereafter, the second communication unit 220 receives contents transmitted from the first mobile terminal 100. In this case, the contents may be the results (or data according to the function execution results) obtained by executing a certain function (or a certain application program) or particular contents that is previously set and corresponds to the certain function (or certain function execution results) (step S1420). Also, the data (or information) according to the function execution results may include a screen image (including various menu screen images) such as a user interface and/or graphic user interface, or the like, previously stored in the first storage unit 120, image data (including a still image, a video, and the like), voice data, information regarding the contents (or contents information), and the like. Also, the pre-set particular contents may include a particular screen image, particular image data, particular voice data, information regarding the particular contents (or particular contents information), or the like.

Also, the second storage unit 230 stores the received contents under the control of the second controller 240 (step S1420).

Thereafter, the second controller 240 outputs the received contents to the second display unit 250 and/or the second audio output unit 260 (step S1430).

For example, when a still image outputted to the first mobile terminal 100 is not included in the contents previously set in the first mobile terminal 100, the second controller 240 receives the still image transmitted from the first mobile terminal 100 through the second communication unit 220 and displays the received still image on the second display unit 250.

In another example, when a text message screen image outputted from the first mobile terminal is included in the contents previously set in the first mobile terminal 100, the second controller 240 receives the image data which is previously set and corresponds to the pre-set contents transmitted from the first mobile terminal 100 through the second communication unit 220 and outputs the received image data to the second display unit 250 and/or the second audio output unit 260 (step S1430).

In this manner, when the contents displayed on the first mobile terminal is pre-set contents (pre-set security-set contents), the contents can be prevented from being provided to the second mobile terminal in communication.

Figure 24:
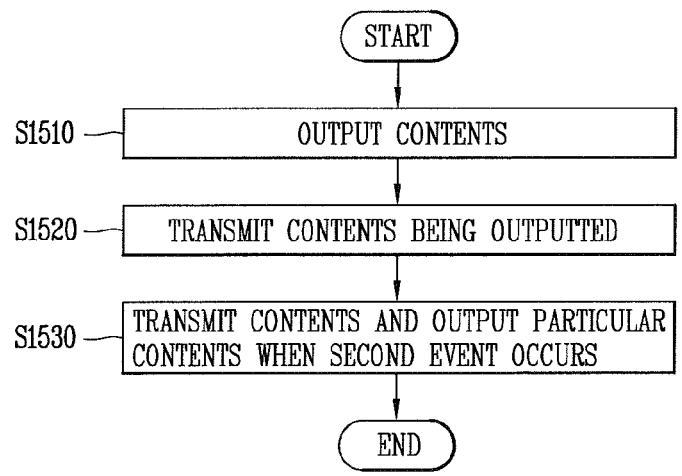
FIG. 24 is a flow chart illustrating the process of a method for controlling a mobile terminal according to a fifteenth embodiment of the present invention.

FIG. 24 is a flow chart illustrating the process of a method for controlling a mobile terminal according to a fifteenth embodiment of the present invention.

First, the first controller provides control to output certain contents previously stored in the first storage unit 120 through the first display unit 140 and/or the first audio output unit 150 (step S1510). In this case, the contents may be the results (or data according to the function execution results) obtained by executing a certain function (or a certain application program) previously stored in the first storage unit 120. Also, the data (or information) according to the function execution results may include a screen image (including various menu screen images) such as a user interface and/or graphic user interface, or the like, previously stored in the first storage unit 120, image data (including a still image, a video, and the like), voice data, information regarding the contents (or contents information), and the like.

Also, when a pre-set event occurs such as when a pre-set button or a pre-set key is selected, when a pre-set time arrives, or the like, the first controller 130 may provide control to output the contents via the first display unit 140 and/or the first audio output unit 150.

For example, as shown in FIG. 5, the first controller 130 outputs a video 510 previously stored in the first storage unit 120 through the first display unit 140 and/or the first audio output unit 150. In this case, the first display unit 140 displays contents information (e.g., the title, brief information, a storage date, a reproduction time, or the like) 520 related to the displayed video 510 at a certain position (step S1510).

Thereafter, the first controller 130 transmits the contents, which is being outputted through the first display unit 140 and/or the first audio output unit 150, to the second mobile terminal 200 in communication therewith through the first communication unit 110 (step S1520). In this case, the first communication unit 110 may include a wired/wireless communication module. Here, as the wireless internet technique, a wireless local area network (WLAN), Wi-Fi, wireless broadband (Wibro), world interoperability for microwave access (WiMAX), high speed downlink packet access (HSDPA), IEEE 802.16, long-term evolution (LTE), a wireless mobile broadband service (WMBS), and the like, may be used. Also, a short-range communication technique may include Bluetooth™, Radio Frequency IDentification (RFID), Infrared Data Association (IrDA), Ultra-WideBand (UWB), ZigBee™, and the like. Also, a wired communication technique may include universal serial bus (USB) communication, or the like. The second mobile terminal 200 may be any one of various terminals such as a car audio device provided in the vehicle, a smartphone, a portable terminal, a mobile terminal, a telematics terminal, a PDA, a Wibro terminal, a navigation terminal, an AVN terminal, and the like (step S1520).

Thereafter, when a certain pre-set second event occurs, for example, when a pre-set second button or a second key is selected, or the like, the first controller 130 provides control to output particular contents previously stored in the first storage unit 120 through the display unit 140 and/or the first audio output unit 150 according to the second event (step S1530). In this case, the particular contents may be the results (or data according to the particular function execution results) obtained by executing a particular function (or a particular application program) previously stored in the first storage unit 120. Also, the data (or information) according to the particular function execution results may include a screen image (including various menu screen images) such as a user interface and/or graphic user interface, or the like, previously stored in the first storage unit 120, image data (including a still image, a video, and the like), voice data, information regarding the particular contents (or contents information), and the like.

Also, the first controller 130 may be in a state of continuously transmitting the contents according to the occurrence of the first event, in a background state, to the second mobile terminal 200 in communication through the first communication unit 110.

For example, when the pre-set second button is selected, the first controller 130 transmits a video, which is outputted through the first display unit 140 and/or the first audio output unit 150, in a background state to the second mobile terminal 200 through the first communication unit 110 and displays a phone number search screen image which is previously stored and corresponds to the second button on the first display unit 140.

Also, when the particular function according to the pre-set second event is terminated, the first controller 130 outputs the contents (e.g., the video) conducted in the background state to the first display unit 140 and/or the first audio output unit 150 and, at the same time, transmits the same to the second mobile terminal 200 in communication through the first communication unit 110 (step S1530).

Figure 25:
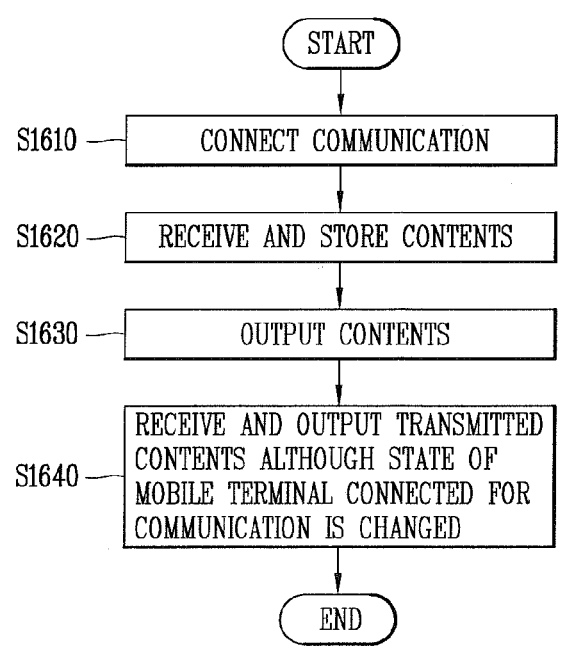
FIG. 25 is a flow chart illustrating the process of a method for controlling a mobile terminal according to a sixteenth embodiment of the present invention.

FIG. 25 is a flow chart illustrating the process of a method for controlling a mobile terminal according to a sixteenth embodiment of the present invention.

First, the second communication unit 220 performs communication connection with the first mobile terminal 100 under the control of the second controller 240 (step S1610). In this case, the second communication unit 220 may include a wired/wireless communication module. Here, as the wireless internet technique, a wireless local area network (WLAN), Wi-Fi, wireless broadband (Wibro), world interoperability for microwave access (WiMAX), high speed downlink packet access (HSDPA), IEEE 802.16, long-term evolution (LTE), a wireless mobile broadband service (WMBS), and the like, may be used. Also, the short-range communication technique may include Bluetooth™, Radio Frequency IDentification (RFID), Infrared Data Association (IrDA), Ultra-WideBand (UWB), ZigBee™, and the like. Also, the wired communication technique may include universal serial bus (USB) communication, or the like. The first mobile terminal 100 may be any one of a smartphone, a portable terminal, a mobile terminal, a telematics terminal, a notebook computer, a digital broadcast terminal, a PDA (Personal Digital Assistant), a Wibro terminal, an IPTV (Internet Protocol Television) terminal, an AVN (Audio Video Navigation) terminal, a PMP (Portable Multimedia Player), a navigation terminal (vehicle navigation device), and the like (step S1610).

Thereafter, the second communication unit 220 receives contents transmitted from the first mobile terminal 100 (step S1620). In this case, the contents may be the results (or data according to the function execution results) obtained by executing a certain function (or a certain application program). Also, the data (or information) according to the function execution results may include a screen image (including various menu screen images) such as a user interface and/or graphic user interface, or the like, previously stored in the first storage unit 120, image data (including a still image, a video, and the like), voice data, information regarding the contents (or contents information), and the like.

Also, the second storage unit 230 stores the received contents under the control of the second controller 240 (step S1620).

Thereafter, the second controller 240 outputs the received contents through the second display unit 250 and/or the second audio output unit 260 (step S1630).

Thereafter, even when a pre-set event occurs in the first mobile terminal 100 in communication therewith, the second controller 240 continuously receives contents transmitted from the first mobile terminal 100 and outputs the received contents through the second display unit 250 and/or the second audio output unit 260 (step S1640).

Namely, although different contents is outputted from the first mobile terminal 100 according to the occurrence of the pre-set event in the first mobile terminal in communication therewith, the second controller 240 operates in a background state in the first mobile terminal 100 to thus receive the contents transmitted to the second mobile terminal 200 and output the received contents (step S1640).

In this manner, the contents being displayed on the first mobile terminal can be provided to the second mobile terminal in communication therewith and, at the same time, different contents can be outputted on the first mobile terminal.

Figure 26:
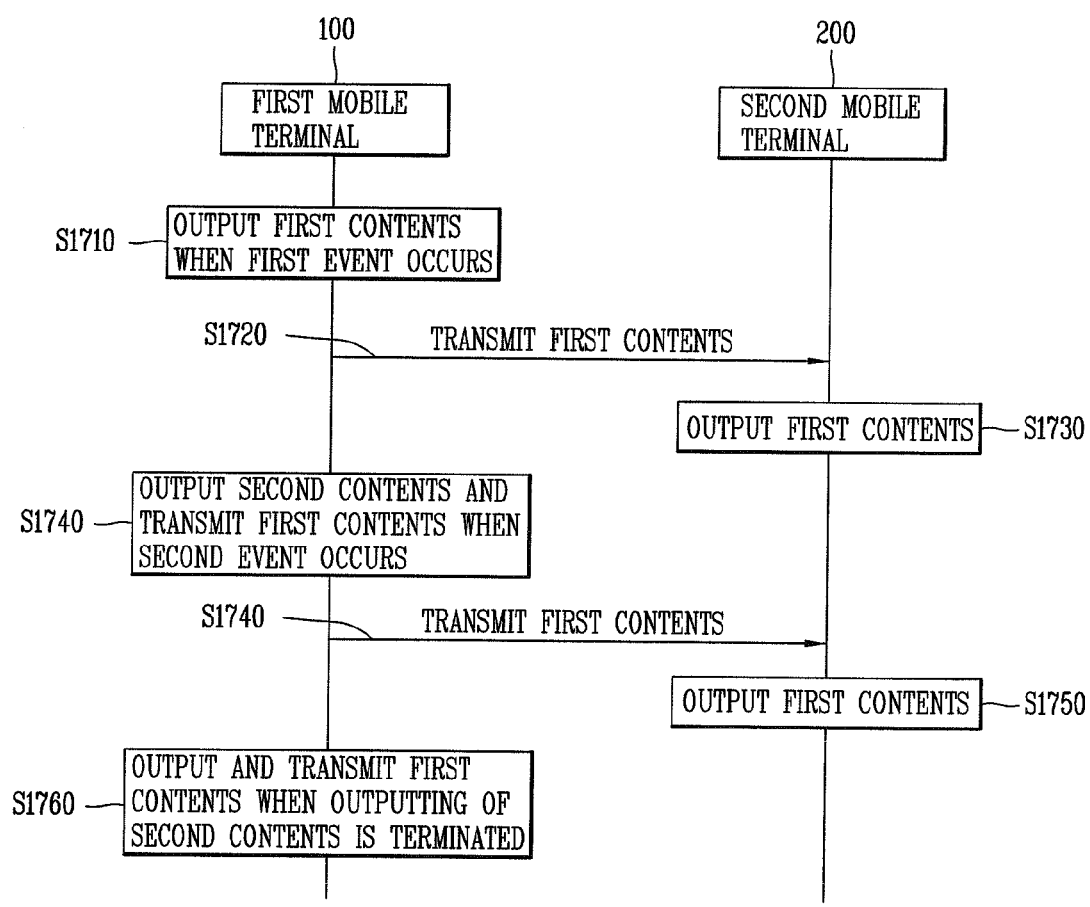
FIG. 26 is a signal flow chart illustrating a communication process of a mobile terminal system according to a seventeenth embodiment of the present invention.

FIG. 26 is a signal flow chart illustrating a communication process of a mobile terminal system according to a seventeenth embodiment of the present invention.

First, when a pre-set first event occurs, the first mobile terminal 100 outputs first contents previously stored in the first mobile terminal 100. Here, the pre-set first event may be an event when a pre-set first button or a first key is selected, when a pre-set time arrives, or the like. In this case, the first contents may be the results (or data according to the function execution results) obtained by executing a certain function (or a certain application program) previously stored in the first storage unit 120. Also, the data (or information) according to the function execution results may include a screen image (including various menu screen images) such as a user interface and/or graphic user interface, or the like, previously stored in the first storage unit 120, image data (including a still image, a video, and the like), voice data, information regarding the contents (or contents information), and the like (step S1710).

Thereafter, the first mobile terminal 100 transmits the output first contents to the second mobile terminal 200 in communication therewith (step S1720).

Thereafter, the second mobile terminal 200 receives the first contents transmitted from the first mobile terminal 100 and stores and outputs the received first contents (step S1730).

Thereafter, when a pre-set second event occurs, the first mobile terminal 100 outputs the second contents previously stored in the first mobile terminal 100 and, at the same time, continuously transmits the first contents, being outputted according to the first event, in a background state to the second mobile terminal 200. In this case, the second contents may be the results (or data according to the particular function execution results) obtained by executing a particular function (or a particular application program) previously stored in the first storage unit 120. Also, the data (or information) according to the particular function execution results may include a particular screen image (including various menu screen images) such as a particular user interface and/or particular graphic user interface, or the like, previously stored in the first storage unit 120, particular image data (including a still image, a video, and the like), particular voice data, information regarding the particular contents (or particular contents information), and the like (step S1740).

Thereafter, even when the pre-set second event occurs, the second mobile terminal 200 continuously receives the first contents transmitted from the first mobile terminal 100 and outputs the received first contents (step S1750).

Thereafter, when the output of the second contents according to the pre-set second event is completed, the first mobile terminal 100 outputs the first contents conducted in the background state and, at the same time, continuously transmits the first contents to the second mobile terminal 200 (step S1760).

In the mobile terminal and a control method thereof according to exemplary embodiment of the present invention, contents, being displayed on the first mobile terminal, can be displayed on the second mobile terminal in communication therewith, thus allowing users to share information.

Also, in the mobile terminal and a control method thereof according to exemplary embodiment of the present invention, since an output of certain contents transmitted from the first mobile terminal can be controlled according to the operational state of a vehicle having the second mobile terminal, user security can be guaranteed.

Also, in the mobile terminal and a control method thereof according to exemplary embodiment of the present invention, by providing information regarding one or more application programs which can be controlled by the second mobile terminal in communication among a plurality of application programs which can be controlled by the first mobile terminal, the function of the remotely connected first mobile terminal can be controlled.

Also, in the mobile terminal and a control method thereof according to exemplary embodiment of the present invention, sine the contents, being displayed on the first mobile terminal, is newly configured according to a configuration state of the second mobile terminal in communication therewith and the newly configured contents are provided to the second mobile terminal, contents according to the configuration state of the second mobile terminal can be conveniently provided to users.

Also, in the mobile terminal and a control method thereof according to exemplary embodiment of the present invention, since contents, being displayed on the first mobile terminal, is newly configured according to the display characteristics of the second mobile terminal and then the newly configured contents is provided to the second mobile terminal, the contents fitting the display characteristics of the second mobile terminal can be provided to users.

Also, in the mobile terminal and a control method thereof according to exemplary embodiment of the present invention, when the contents, being displayed on the first mobile terminal, is pre-set contents (pre-set security-set contents), the contents is prevented from being provided to the second mobile terminal in communication therewith, thus protecting user's privacy.

Also, in the mobile terminal and a control method thereof according to exemplary embodiment of the present invention, contents, being displayed on the first mobile terminal, is provided to the second mobile terminal in communication therewith and, at the same time, the first mobile terminal outputs different contents, whereby the first mobile terminal can simultaneously perform a plurality of functions.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A method for controlling a mobile terminal, the method comprising:
    outputting, by the mobile terminal, previously stored contents; and
    controlling a transmission of the contents being outputted, the step of controlling including receiving, by the mobile terminal, information concerning a second terminal;
    transmitting, by the mobile terminal, the contents to the second terminal if the received information meets a predetermined condition; and
    transmitting, by the mobile terminal, data related to the contents to the second mobile terminal if the received information does not meet the predetermined condition,
    wherein the received information includes speed information of the second terminal, and
    wherein the predetermined condition is a speed threshold.

2. The method of claim 1, wherein the contents comprises at least one of a menu screen image, image data, voice data, and contents information.

3. The method of claim 2, wherein the contents information comprises at least one of a title of the contents, descriptive information regarding the contents, and storage data of the contents.

4. The method of claim 1, wherein the received information concerning the second terminal further comprises at least one of list information regarding one or more application programs controllable by the second terminal, and configuration information of the second terminal.

5. The method of claim 1, wherein the step of controlling the transmission of the contents being outputted comprises:
    searching for an application program name included in first list information of at least one application program previously stored in the first-mobile terminal, the first list information including at least one of an application program name, an application program type, and an application program icon/emoticon, and second list information regarding one or more application programs controllable by the second mobile terminal;
    generating a menu list based on one or more application program names included in the first list information and the second list information; and transmitting the generated menu list to the second mobile terminal.

6. The method of claim 5, wherein the menu list comprises at least an application program name, an application program type, and an application program icon/emoticon of one or more applications that are controllable by the second terminal among at least one application program previously stored in the mobile terminal.

7. The method of claim 1, wherein the step of controlling the transmission of the contents being outputted comprises:
generating new contents based on the contents being outputted and video codec configuration information or audio codec configuration information of the second mobile terminal; and
transmitting the generated new contents to the second mobile terminal.

8. The method of claim 7, wherein the step of generating new contents comprises:
magnifying or reducing a menu space with respect to menus included in the contents being outputted based on the video codec configuration information of the second mobile terminal;
magnifying or reducing with respect to text included in the contents being outputted based on the video codec configuration information of the second mobile terminal; and
adding a particular user interface or a particular graphic user interface to the contents being outputted.

9. The method of claim 1, wherein the step of controlling the transmission of the contents being outputted comprises:
generating new contents based on the contents being outputted and horizontal display characteristic information included in display characteristic information of the second terminal or generating new contents based on the contents being outputted and vertical display characteristic information included in the display characteristic information of the second mobile terminal; and
transmitting the generated new contents to the second mobile-terminal.

10. The method of claim 1, wherein the step of controlling the transmission of the contents being outputted comprises:
checking whether the contents being outputted are included in particular contents for which a security function has been set; and
when the contents being outputted are included in the particular contents, transmitting pre-set second contents corresponding to the particular contents to the second terminal.

11. The method of claim 1, wherein the step of controlling the transmission of the contents being output further comprises:
when a pre-set event occurs, transmitting the contents being outputted in a background state to the second terminal, and simultaneously outputting second contents corresponding to the pre-set event.

12. The method of claim 11, wherein the step of controlling the transmission of the contents being output further comprises:
when the outputting of the second contents is terminated, outputting the contents being transmitted to the second terminal in the background state, and simultaneously transmitting the same to the second terminal.

13. A mobile terminal, comprising:
a display unit configured to output contents previously stored in a storage unit; and
a controller operatively connected to the display unit and configured to
control a transmission of the contents being outputted, the controller configured to
receive information concerning a second terminal,
transmit the contents to the second terminal if the received information meets a predetermined condition, and
transmit data related to the contents to the second terminal if the received information does not meet the predetermined condition,
wherein the received information includes speed information of the second terminal, and
wherein the predetermined condition is a speed threshold.

14. The mobile terminal of claim 13, wherein the received information concerning the second terminal further comprises at least one of list information regarding one or more application programs controllable by the second mobile-terminal, and configuration information of the second terminal.

15. The mobile terminal of claim 13,
wherein the contents comprises at least one of a menu screen image, image data, voice data, and contents information, and
wherein the contents information comprises at least one of a title of the contents, descriptive information regarding the contents, and storage data of the contents.

16. The mobile terminal of claim 13, wherein the controller is configured to
search for an application program name included in first list information of at least one application program previously stored in the mobile terminal, the first list information including at least one of an application program name, an application program type, and an application program icon/emoticon, and second list information regarding one or more application programs controllable by the second terminal,
generate a menu list based on one or more application program names included in the first list information and the second list information, and
transmit the generated menu list to the second mobile-terminal.

17. The mobile terminal of claim 13, wherein the controller is configured to
generate new contents based on the contents being outputted and video codec configuration information or audio codec configuration information of the second mobile terminal, and
transmit the generated new contents to the second mobile-terminal.

18. The mobile terminal of claim 13, wherein the controller is configured to
generate new contents based on the contents being outputted and horizontal display characteristic information included in display characteristic information of the second mobile terminal or generate new contents based on the contents being outputted and vertical display characteristic information included in the display characteristic information of the second mobile terminal, and
transmit the generated new contents to the second terminal.

19. The mobile terminal of claim 13, wherein when the contents being outputted is included in particular contents for which a security function has been set, the controller is configured to transmit pre-set second contents corresponding to the particular contents to the second terminal.

20. The mobile terminal of claim 13, wherein when a pre-set event occurs, the controller is configured to
transmit the contents being outputted in a background state to the second mobile terminal, and simultaneously output second contents corresponding to the pre-set event to the display unit.

21. The mobile terminal of claim 20, wherein, when the outputting of the second contents is terminated, the controller is configured to output the contents being transmitted in the background state to the display unit, and simultaneously transmit the same to the second terminal.

22. A method for controlling a mobile terminal, the method comprising:

transmitting, by the mobile terminal, information concerning the mobile terminal to another mobile terminal; and receiving, by the mobile terminal, one of contents and data related to the contents from the another mobile terminal, the one of contents and data related to the contents being transmitted from the another mobile terminal based on the transmitted information, wherein the another mobile terminal transmits the contents to the terminal if the transmitted information meets a predetermined condition, wherein the another mobile terminal transmits the data related to the contents to the mobile terminal if the transmitted information does not meet the predetermined condition, wherein the transmitted information includes speed information of the mobile terminal, and wherein the predetermined condition is a speed threshold.

23. The method of claim 22, wherein the transmitted information concerning the mobile terminal further comprises at least one of list information regarding one or more application programs controllable by the mobile terminal, and configuration information of the mobile terminal.

24. A mobile terminal, comprising:

a communication unit configured to receive contents transmitted from another mobile terminal;

a display unit; and a controller operatively connected to the communication unit and the display unit, the controller configured to transmit information concerning the mobile terminal to the another mobile terminal, and receive one of contents and data related to the contents from the another mobile terminal, the one of contents and data related to the contents being transmitted from the another mobile terminal based on the transmitted information, wherein the another mobile terminal transmits the contents to the terminal if the transmitted information meets a predetermined condition, wherein the another mobile terminal transmits the data related to the contents to the mobile terminal if the transmitted information does not meet the predetermined condition, wherein the transmitted information includes speed information of the mobile terminal, and wherein the predetermined condition is a speed threshold.

25. The mobile terminal of claim 24, wherein the transmitted information concerning the mobile terminal further comprises at least one of list information regarding one or more application programs controllable by the mobile terminal, and configuration information.

* * * * *